(12) United States Patent
Dieterle et al.

(10) Patent No.: US 6,831,431 B1
(45) Date of Patent: Dec. 14, 2004

(54) METHOD FOR REGULATING THE ROTATIONAL SPEED OF A MOTOR AND A MOTOR FOR CARRYING OUT A METHOD OF THIS TYPE

(75) Inventors: Roland Dieterle, St. Georgen (DE); Alexander Hahn, Bad Boll (DE); Hermann Rappenecker, Vohrenbach (DE)

(73) Assignee: Papst-Motoren GmbH & Co. KG, St. Georgen (DE)

( * ) Notice: Subject to any disclaimer, the term of this patent is extended or adjusted under 35 U.S.C. 154(b) by 28 days.

(21) Appl. No.: 10/019,849

(22) PCT Filed: Aug. 5, 2000

(86) PCT No.: PCT/EP00/07622

§ 371 (c)(1),
(2), (4) Date: Nov. 1, 2001

(87) PCT Pub. No.: WO01/22095

PCT Pub. Date: Mar. 29, 2001

(30) Foreign Application Priority Data

Sep. 22, 1999 (DE) .......................................... 199 45 313
Oct. 15, 1999 (DE) .......................................... 199 49 693

(51) Int. Cl.[7] .............................. H02P 5/00; H02P 5/34
(52) U.S. Cl. ...................... 318/268; 318/779; 318/798; 318/799; 318/807
(58) Field of Search ............................ 318/268, 779.7, 318/98, 799, 807

(56) References Cited

U.S. PATENT DOCUMENTS

| | | | |
|---|---|---|---|
| 3,873,897 A | 3/1975 | Müller et al. | 318/138 |
| 4,360,767 A | 11/1982 | Akiyama et al. | 318/318 |

(List continued on next page.)

FOREIGN PATENT DOCUMENTS

| | | |
|---|---|---|
| DE | 23 46 380 | 11/1974 |
| DE | 30 05 154 | 2/1980 |
| DE | 29 49 131 A1 | 6/1981 |
| DE | 32 24 485 | 6/1982 |
| DE | 37 09 395 A1 | 9/1988 |
| DE | 40 25 263 | 9/1990 |
| DE | 196 47 983 | 11/1996 |
| DE | 195 30 677 A1 | 2/1997 |

(List continued on next page.)

OTHER PUBLICATIONS

WPI English abstract of DE 29 49 131, Renner/Deuta–Werke, publ. Jun. 11, 1981.

(List continued on next page.)

*Primary Examiner*—Kimberly Lockett
*Assistant Examiner*—Patrick Miller
(74) *Attorney, Agent, or Firm*—Milton Oliver; Ware Fressola Van Der Sluys & Adolphson LLP

(57) ABSTRACT

The invention concerns a method for regulating the rotation speed, of a motor with which a digital rotation speed controller is associated and which, during operation, furnishes an actual-value signal for the rotation speed in the form of a rotation speed frequency signal, toward a target rotation speed setpoint defined in the form of a setpoint frequency signal, having the following steps: in a first time segment, a first numerical frequency value that characterizes the rotation speed of the motor is ascertained from the rotation speed frequency signal; in a second time segment that is substantially simultaneous with the first time segment, a second numerical frequency value that characterizes the frequency of the setpoint frequency signal is ascertained from the setpoint frequency signal; by means of the first and second numerical frequency values, the rotation speed of the motor is regulated in the digital rotation speed controller to a rotation speed that is associated with the setpoint frequency signal according to a predetermined mathematical relationship.

56 Claims, 27 Drawing Sheets

U.S. PATENT DOCUMENTS

| | | | |
|---|---|---|---|
| 4,441,061 A | 4/1984 | Yoshida et al. ............. 318/329 |
| 4,485,452 A | 11/1984 | Cording et al. ............. 364/565 |
| 4,569,027 A | 2/1986 | Nakano et al. ............. 364/565 |
| 4,584,528 A | 4/1986 | Ohmae et al. ............. 324/166 |
| 4,788,476 A | 11/1988 | Ginier ......................... 318/41 |
| 4,800,508 A | 1/1989 | Frederich ................... 364/484 |
| 5,148,089 A | * 9/1992 | Adachi et al. ................. 318/66 |
| 5,237,521 A | 8/1993 | Raj et al. .................... 364/561 |
| 5,502,376 A | 3/1996 | Busch ........................ 324/166 |
| 5,737,216 A | * 4/1998 | Hokari ......................... 700/56 |
| 5,757,676 A | 5/1998 | Hobelsberger .............. 364/565 |
| 5,780,984 A | * 7/1998 | Miyako et al. ............. 318/268 |
| 5,845,045 A | 12/1998 | Jeske et al. ................. 388/804 |
| 5,936,378 A | * 8/1999 | Iijima et al. ................ 318/807 |
| 6,037,734 A | * 3/2000 | Toyomura ................... 318/602 |
| 6,037,765 A | 3/2000 | Sager et al. ................. 324/166 |
| 6,091,887 A | 7/2000 | Dieterle et al. ............. 388/811 |
| 6,097,564 A | * 8/2000 | Hunter .................... 360/78.04 |
| 6,313,601 B1 | * 11/2001 | Kubo et al. ................. 318/799 |
| 6,459,230 B1 | * 10/2002 | Tao ............................ 318/798 |
| 6,496,786 B1 | * 12/2002 | Dieterle et al. ............. 702/145 |

FOREIGN PATENT DOCUMENTS

| | | |
|---|---|---|
| DE | 195 36 840 A1 | 4/1997 |
| EP | 0 059 433 A1 | 9/1982 |
| EP | 0 090 717 A1 | 10/1983 |
| EP | 0 849 598 A1 | 11/1997 |
| GB | 2 192 103 A | 6/1987 |

OTHER PUBLICATIONS

WPI English abstract of DE 37 09 395, Reiners/Licentia, publ. Sep. 29, 1988.

WPI English abstract of DE 40 25 263, Segger/Laschet, publ. Feb. 13, 1992.

WPI English abstract of DE 195 30 677–A1, Boeffel/Siemens, publ. Feb. 27, 1997.

Microchip Technology Inc., "PIC16C72 Series 8–Bit CMOS Microcontrollers with A/D Converter," (datasheet DS39016A, coprt. 1999, Chandler AZ), pp. 1–25 & 117–124.

* cited by examiner

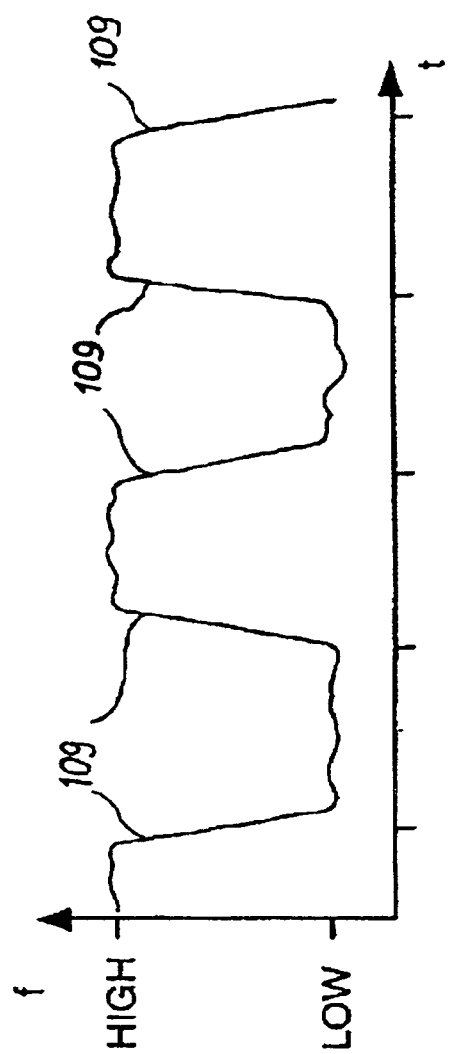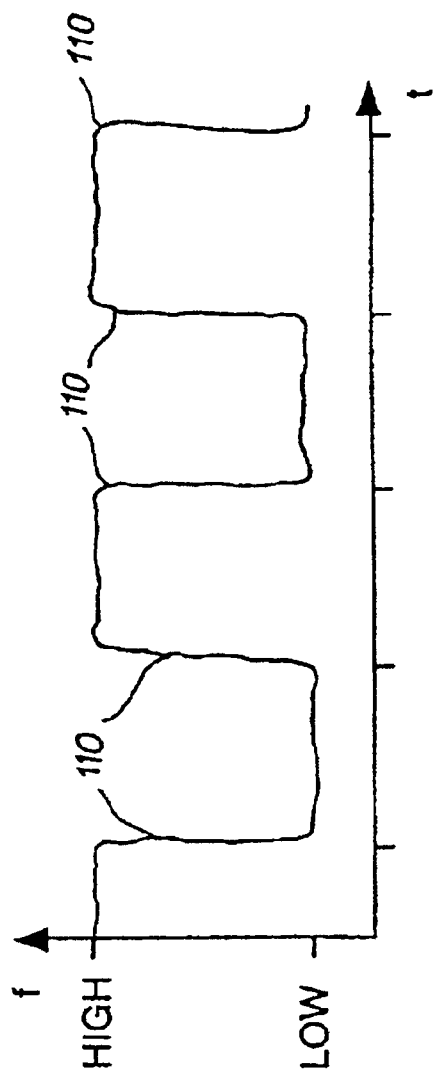
Fig. 4
Fig. 4A
Fig. 4B

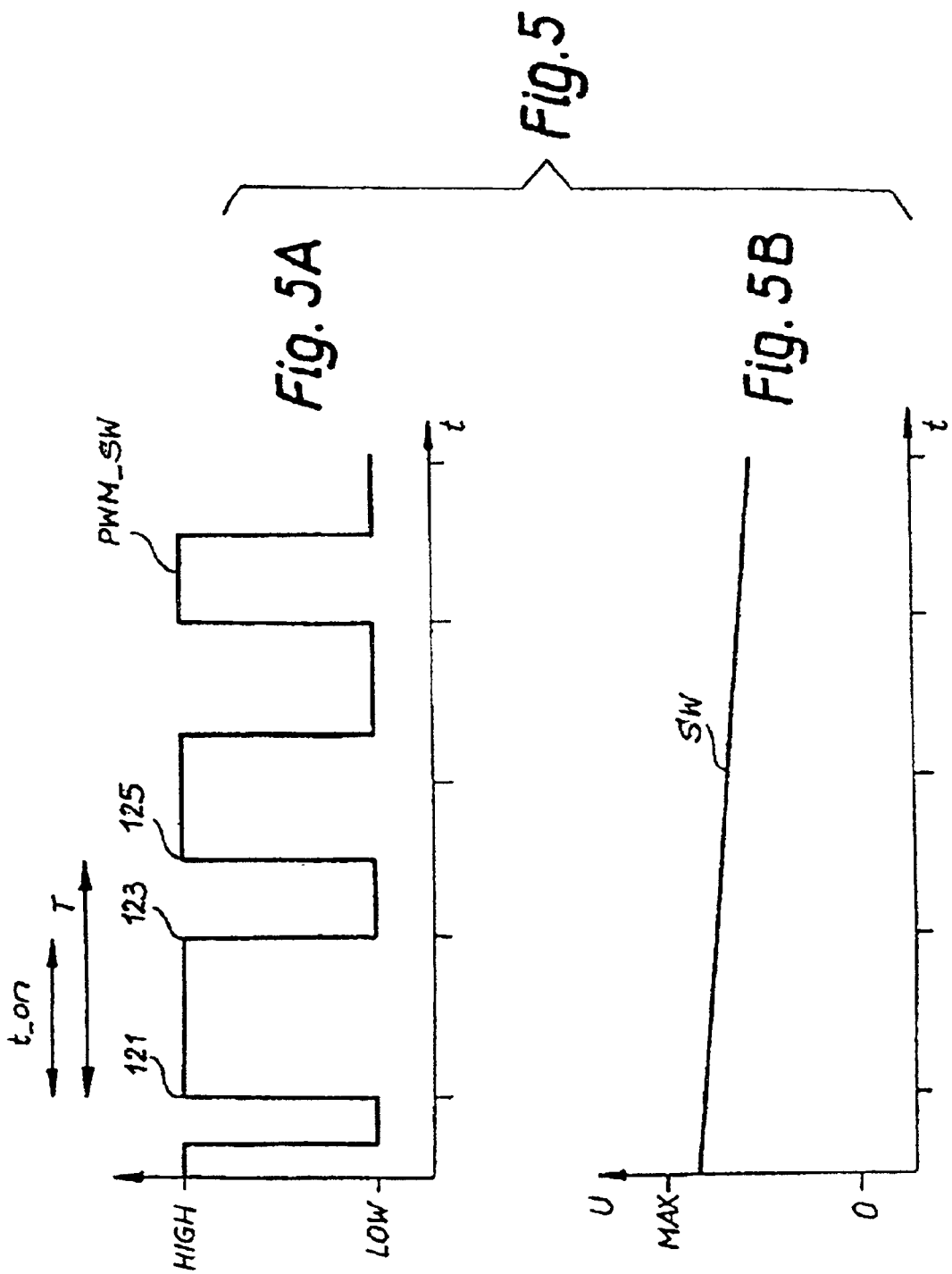

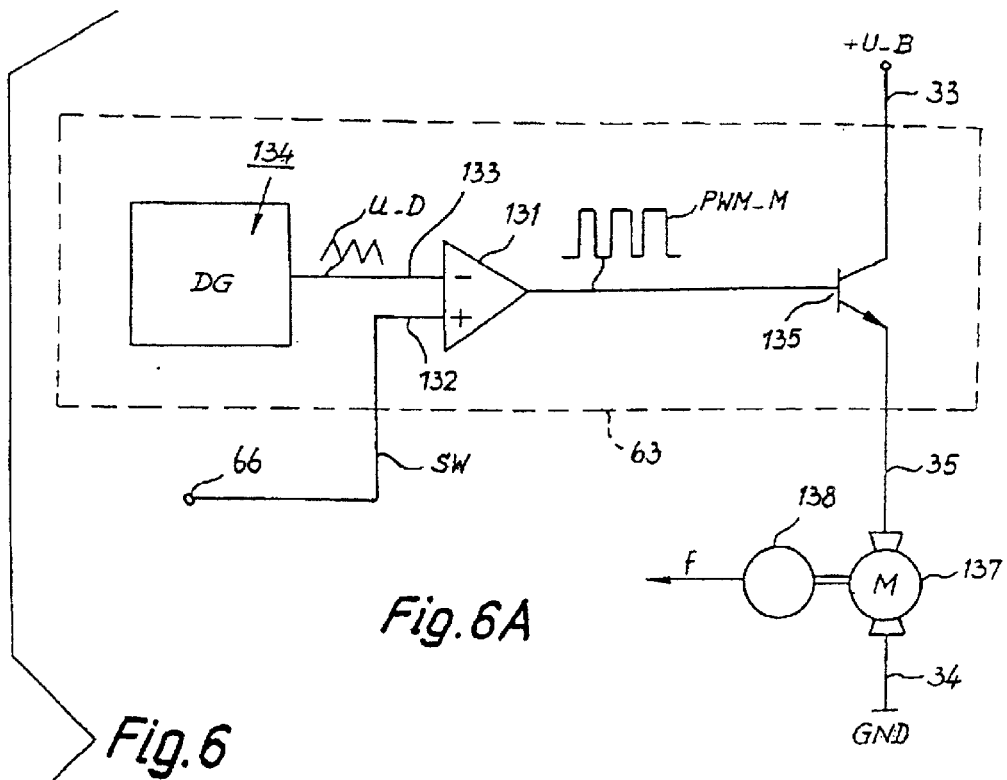
Fig.6A
Fig.6
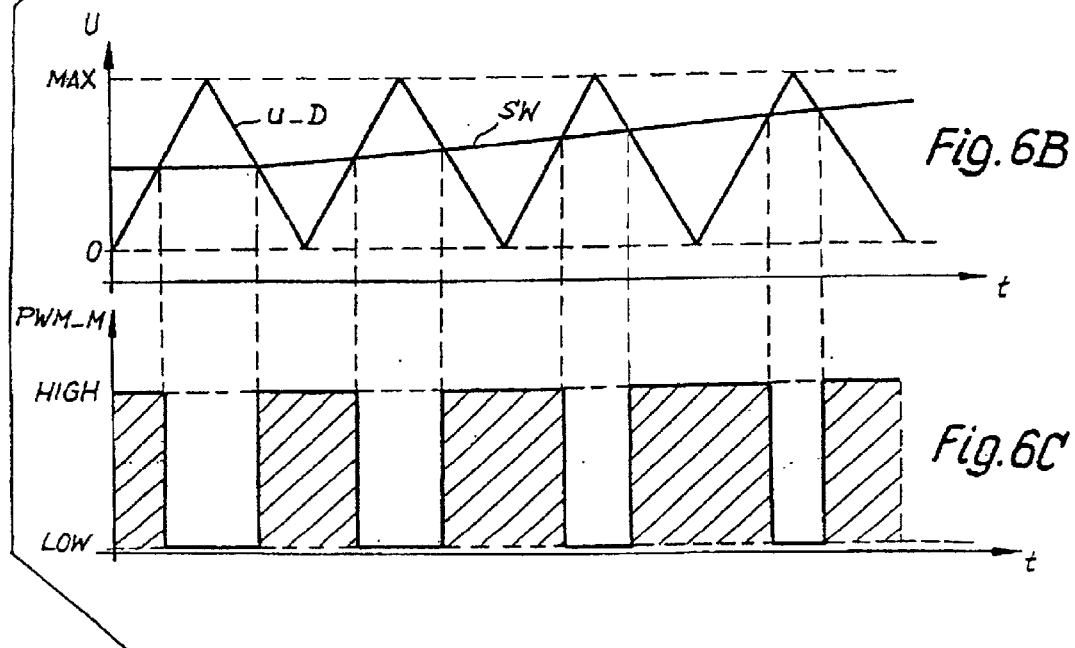
Fig.6B
Fig.6C

METHOD FOR REGULATING THE ROTATIONAL SPEED OF A MOTOR AND A MOTOR FOR CARRYING OUT A METHOD OF THIS TYPE

FIELD OF THE INVENTION

The invention concerns a method for regulating the rotation speed of a motor, and a motor for carrying out such a method.

BACKGROUND

Digital systems for sensing and regulating the rotation speed of a rotating object ("rotor") are based on the fact that such a rotor generates one or more signals, e.g. needle pulses, pulse edges, or the like, at each revolution. These signals are referred to hereinafter as "events." Measurement of a rotation speed is based on measuring the time offset 1 between such "events" or counting the number of such "events" that occur per unit time. In a regulation process, this rotation speed information is used to keep the rotation speed of a motor at a defined value. A "motor" (prime mover) is understood here to be any kind of motor, e.g. an internal combustion engine, electric motor, pneumatically or hydraulically operating is motor, turbine, etc. The invention is preferably applied to regulating the rotation speed of electric motors.

Since the number of such "events" per unit time increases with increasing rotation speed, processing them in a digital system requires more calculation time as the rotation speed becomes greater, so that the calculation time available for other processes decreases.

SUMMARY OF THE INVENTION

It is an object of the invention to make available a new method for regulating the rotation speed of a motor, and a motor for carrying out such a method.

According to a first aspect of the invention, this object is achieved by [a method according to claim 1.] calculating a first numerical frequency value representing actual rotation speed and a second numerical frequency value representing a target rotation speed, and processing these values in a digital motor controller in order to regulate the rotation speed toward the target value. Because two digital frequency values are calculated, it is possible to subject one or even both of said frequency values to a mathematical transformation and thus, by means of the digital controller, to create a desired relationship between the first and the second frequency value. Often one of the digital frequency values, or even both, will be multiplied by a constant factor, which in digital terms is often possible by decimal-point shifting and easily makes possible an electronic gearbox; other relationships are also conceivable, however, for example an exponential function or any other mathematical function in accordance with the requirements of the particular drive system task.

A particularly advantageous embodiment of the invention is [the subject matter of claim 5] to define a series of four instants which span multiple "events" of the frequency signal, and to use a count of events between the second and fourth instants to calculate the frequency. Because multiple "events" of the frequency signal can be sensed with one measurement, an averaging takes place upon measurement of the frequency information. This is because if the frequency is ascertained by means of a plurality of short measurements, it is often necessary to determine a moving average from multiple measured values by calculation. With the invention, on the other hand, an average is obtained without additional calculation, thus additionally relieving the load on, for example, a microprocessor or microcontroller, both hereinafter abbreviated as $\mu C$. And despite the approximate definition of a measurement duration by means of the predetermined instants, in the method the actual measurement takes place exactly between two events of the frequency signal. This has proven particularly advantageous because measurement exactly between two defined events of a frequency signal makes possible particularly high accuracy.

Another advantageous development of the invention is [the subject matter of claim 8] to count "events" which happen a fixed number of times per revolution of the rotor. The result of this is that, upon measurement of a rotation speed datum in the context of a rotor having a fixed number of "events" per rotor revolution, measurement always occurs between such "events" which are associated with the same rotational position of the rotor, i.e. complete revolutions are measured. This is of interest in particular for rotors which comprise multiple "marks" for generating the rotor position signal, which marks do not have identical angular spacings. The result of the development, [according to claim 8] using such a fixed number of events per revolution, is thus that measurement always occurs at the same point on the rotor, so that the exactness of the angular spacings is immaterial. High measurement accuracy results therefrom. "Marks" are understood here also to mean invisible marks, e.g. a pattern in the magnetization of a permanent-magnet rotor.

Another advantageous development of the invention is [the subject matter of claim 12] to have the fourth instant of a first measurement correspond to the second instant of a second measurement. A frequency datum is measured continuously by means of such a method, since the next measurement seamlessly follows the present measurement. In the vicinity of each predetermined instant, a present measurement is ended and a new measurement is begun. If the predetermined instants each occur after a time T_A, a measurement then takes place, on average, after a time T_A in each case. Processing of the measurements, for example in a $\mu C$, thus takes place at regular intervals that are independent of the rotation speed. The $\mu C$ is thereby under a uniform load for these tasks at all rotation speeds. Since in this case there is no pause between the individual measurements, this method is particularly suitable if each individual revolution of the rotor must be taken into account for measurement or regulation, for example as is necessary in motors with high-accuracy controllers or in stepping motors.

The invention furthermore concerns a method according to [claim 16] which the remainder from a first measurement is used in the calculation for a following measurement. The result of taking into account the remainder in the subsequent measurement is that, in the context of a calculation of the frequency information by division, no frequency information is lost due to rounding. This results very advantageously in an increase in the accuracy of the measurement, and is very advantageous in the context of complex control processes that require high precision. Two or more motors can thus run synchronously with one another by the fact that the same frequency signal is delivered to all said motors, i.e. without a higher-level controller. Systems having higher-level controllers are relatively slow, have long initial transients, and are susceptible to oscillations especially at low rotation speeds. A method according to the invention, on the other hand, operates quickly because only a few program steps are needed to take the remainder into account. A method according to the present invention can also easily be switched over to different parameters, e.g. to a different "gearbox factor," different control parameters, etc.

The preferred use of a ring counter [according to claim 25] to measure the time between first and second instants, and the development [according to claim 26] in which the ring counter counts continuously, have the advantage that the termination of one measurement and the start of the subsequent measurement are simultaneous because the ring counter is always running, so that no errors can occur due to measurement delay; and any delays (resulting, for example, from the simultaneous occurrence of two interrupts) are subsequently immediately compensated for, since the time of the subsequent measurement cycle automatically becomes slightly too short.

This makes possible seamless sensing of the rotation speed and an average rotation speed sensing error that is close to zero, since not a single bit is lost during measurement. A ring counter of this kind usually has a so-called pre-scaler with which it is possible to set the frequency at which said counter counts. By setting this function on a bit-by-bit basis, the ring counter can be clocked at various fixed multiples of the quartz oscillator frequency of the $\mu C$. The counting frequency and resolution of the ring counter can thereby be optimized for the application. This setting can be accomplished by way of a parameter that is stored in the motor in a nonvolatile memory. The resolution of the ring counter can thereby be optimized for different rotation speed ranges using different parameters.

Further details and advantageous developments of the invention are evident from the exemplary embodiments—which are in no way to be understood as a limitation of the invention—that are described below and depicted in the drawings, and from the other dependent claims. In the drawings:

FIG. 4 shows a frequency signal f before and after signal processing;

FIG. 5 is a schematic depiction to explain a detail of FIG. 3;

FIG. 6 is a schematic depiction to explain a detail of FIG. 3;

Figure 28:
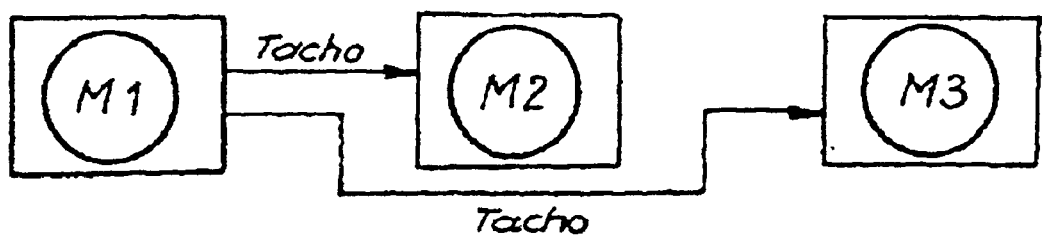
Figure 29:
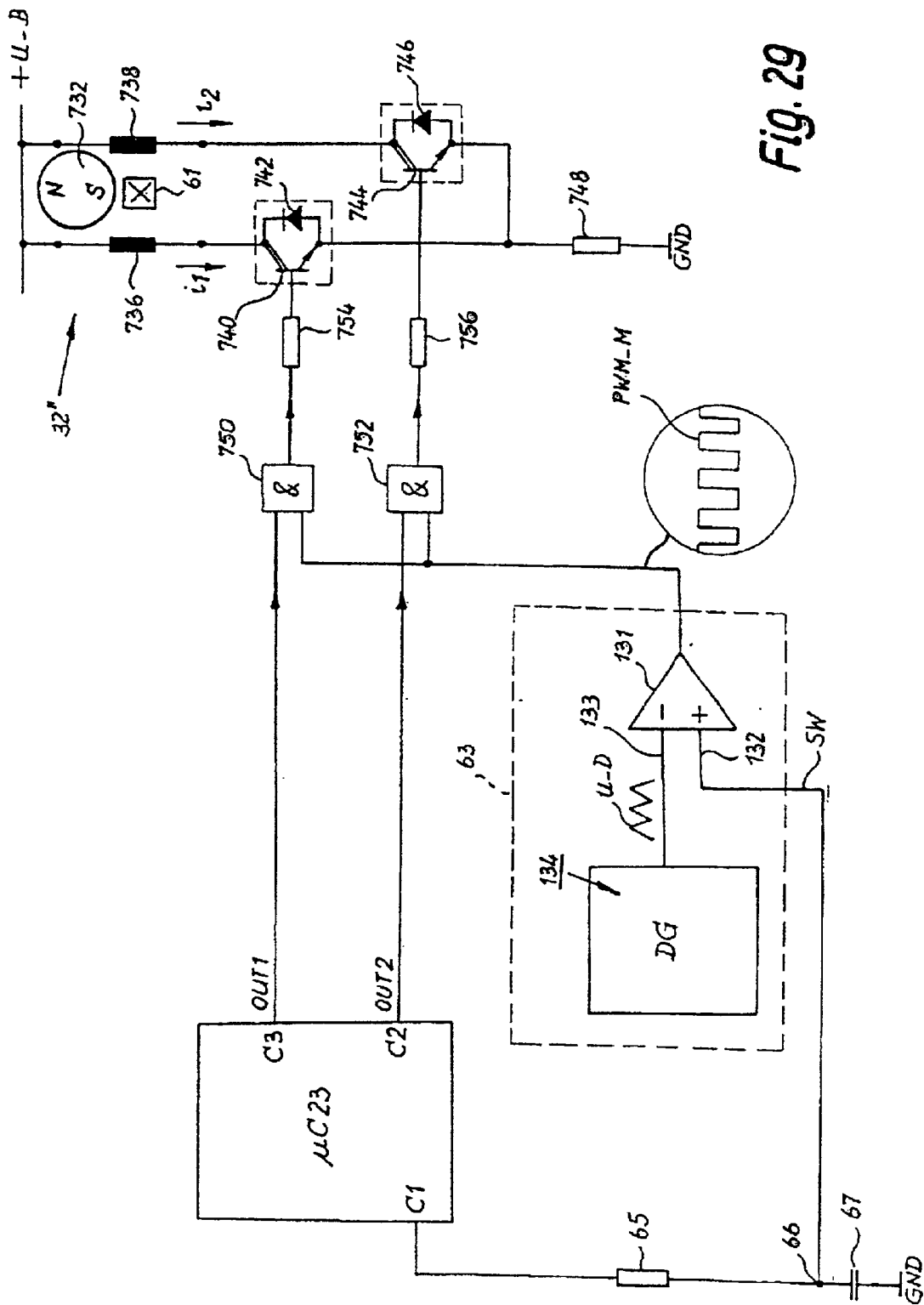

FIG. 28 is a schematic depiction with three motors M1, M2, M3, of which M1 is the master motor that supplies to the two other motors M2 and M3 a signal TACHO that constitutes an indication of the rotation speed of M1 and that regulates the rotation speeds of the other two motors in such a way that said rotation speeds are always at a defined ratio to the rotation speed of motor M1; and FIG. 29 is a schematic depiction analogous to FIG. 6 which shows the commutation of an electronically commutated motor 32" by $\mu C$ 23.

Identical or identically operating parts are labeled hereinafter with the same reference characters and are usually described only once.

DETAILED DESCRIPTION

Figure 1:
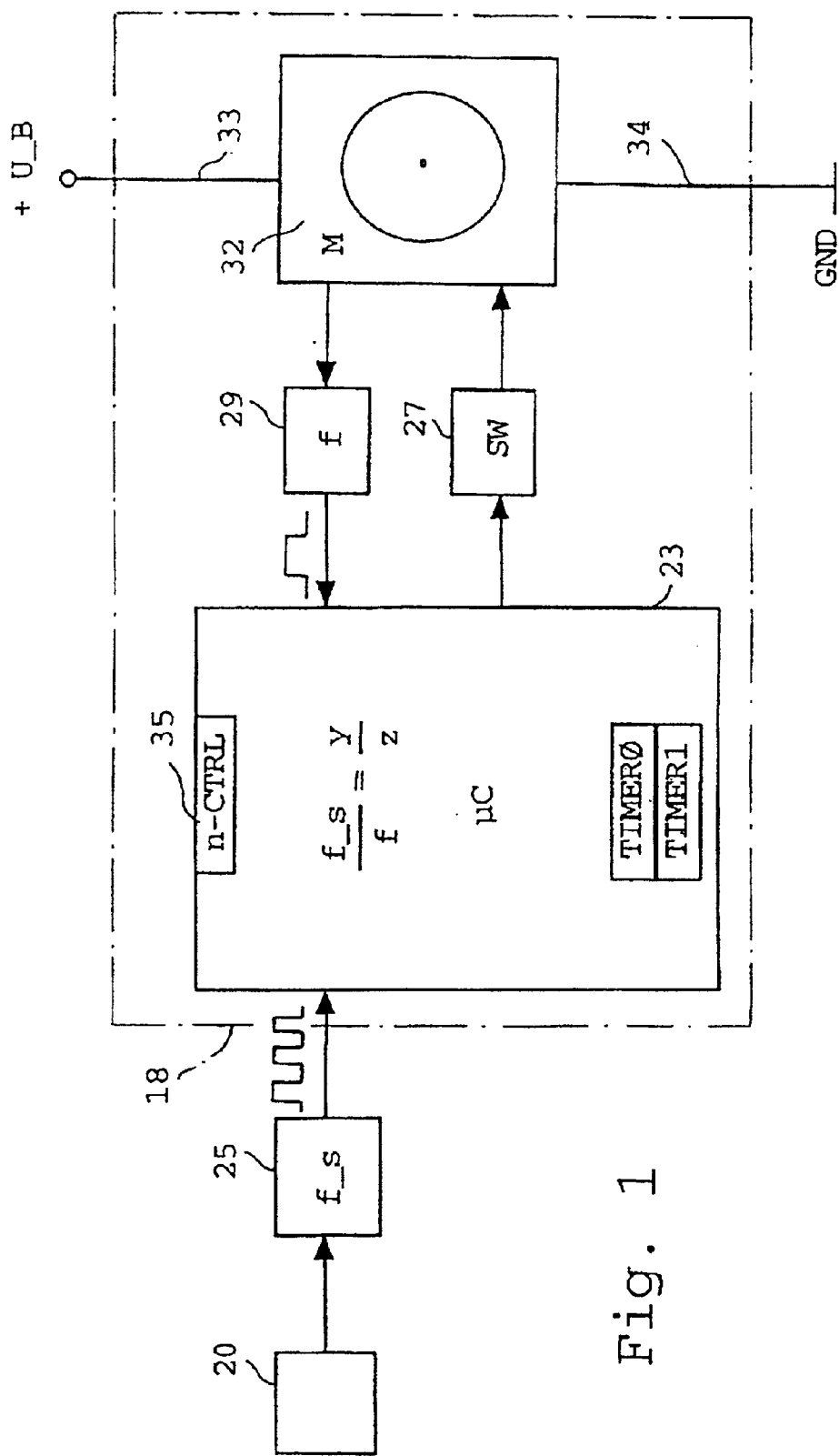
FIG. 1 is a schematic depiction of an arrangement according to the present invention for regulating the rotation speed of a motor to a value that is defined from outside by a frequency signal f_s.

FIG. 1 is a block diagram of an arrangement 18 according to the present invention having one motor M. The latter is depicted here as electric motor 32, but could be any other motor whose rotation speed can be modified by means of an actuating signal, e.g. in the case of an internal combustion engine by means of a change in fuel delivery, in the case of a steam turbine by way of a change in steam delivery, etc.

Electric motor 32 is connected at a terminal 33 to a positive operating voltage +U_B and at another terminal 34 to ground GND. The energization of motor 32 is controlled by means of a control output SW 27 in order to regulate its rotation speed. A rotor position signal of motor 32 is delivered as frequency f 29 to a microprocessor or microcontroller, hereinafter called µC 23. A target or setpoint frequency f_s 25 is also delivered to µC 23, e.g. from a frequency generator 20 that can also be, for example, another electric motor, as will be described below with reference to FIG. 28. In FIG. 28, motor M1 defines, by way of its output signal, the rotation speed of motors M2 and M3, i.e. the latter can, for example, run at the same rotation speed as motor M1, or at different rotation speeds that are at a desired rotation speed ratio to the rotation speed of motor M1.

Since µC 23 is small, it can be combined together with motor 32 into module 18, namely into a motor unit 18 with an "electronic gearbox." This is possible even for electric motors that are referred to, according to the common definition, as miniature or subminiature motors.

Implemented in µC is a rotation speed controller n-CTRL 35 that regulates control output SW 27 so as to create, between setpoint frequency f_s and actual frequency f, a fixed ratio that can be described as follows:

$$f\_s/f = y/z \quad (1)$$

where y and z are whole numbers. This is therefore the aforementioned "electronic gearbox."

Figure 26:
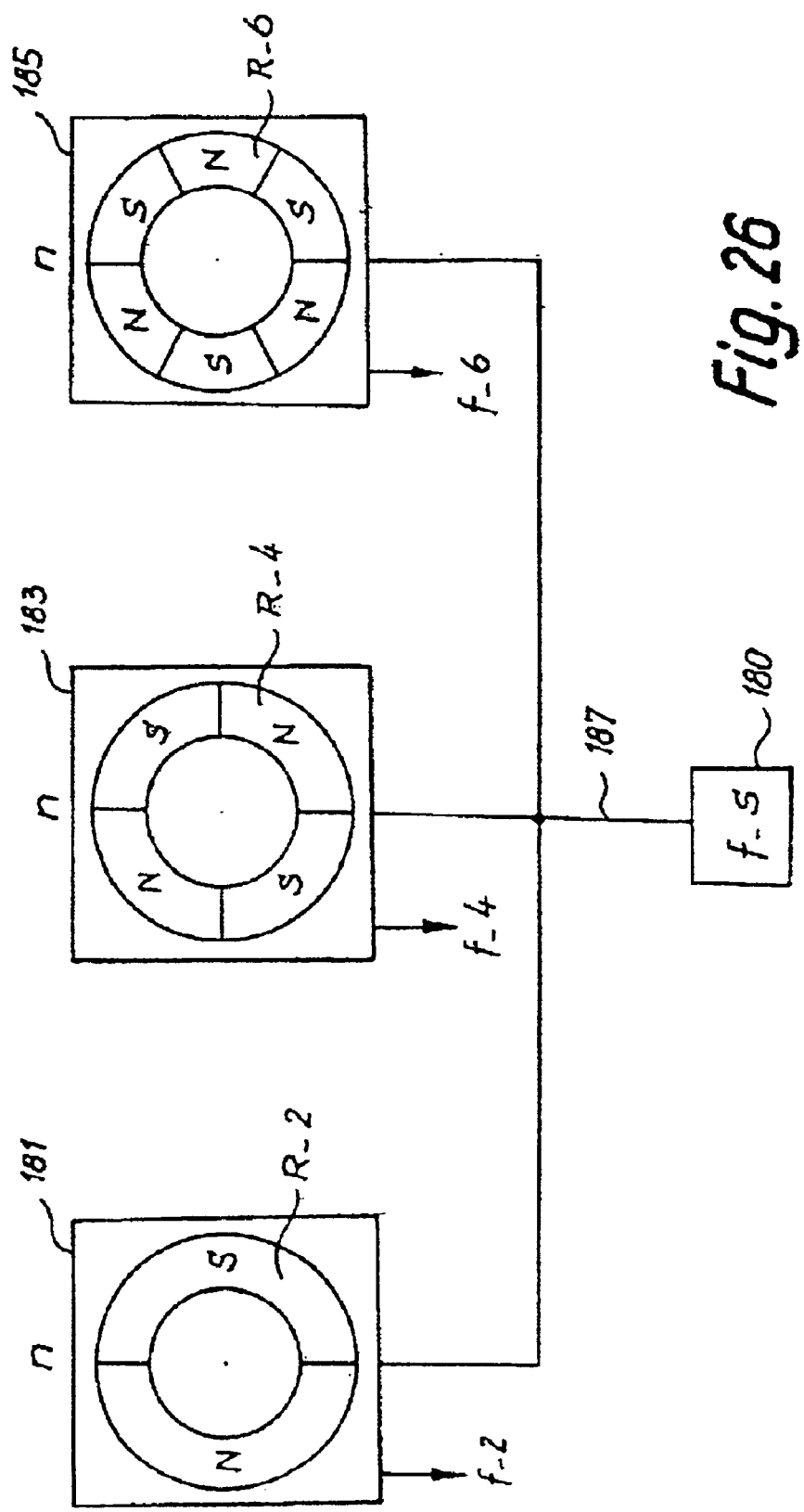
FIG. 26 is a depiction with three electric motors 181, 183, 185 which have different numbers of rotor poles and which here are regulated by the same setpoint frequency signal f_s to the same rotation speed n.

This makes it possible, for example, synchronously to control one motor 181 having a two-pole rotor R_2, one motor 183 having a four-pole rotor R_4, and one motor 185 having a six-pole rotor R_6 using a single setpoint frequency f_s, as depicted in FIG. 26, so that, for example, all three motors rotate at the same desired rotation speed n that is at a specific ratio to f_s.

For that purpose, for example, $$f\_s/f\_2 = 20/2,$$

$$f\_s/f\_4 = 20/4, \text{ and}$$

at $f\_s/f\_6 = 20/6$ are set, f_2 being the actual frequency of two-pole rotor R_2, f_4 the actual frequency of four-pole rotor R_4, and f_6 the actual frequency of rotor R_6. The depiction in FIG. 26 is based on the assumption that a Hall generator controlled by the magnetic field of the rotor in question is used therein, in the usual way, to sense the rotor position (cf. FIG. 11C and FIG. 29). The ratios result from the fact that with two-pole rotor R_2, two changes in the Hall signal ("Hall changes") take place per revolution, while with four-pole rotor R_4 four Hall changes take place per revolution, and with six-pole rotor R_6, six Hall changes occur per revolution.

An arrangement of this kind is of interest principally for devices having several motors, in which the motors must be at a fixed rotation speed ratio to one another.

Figure 2:
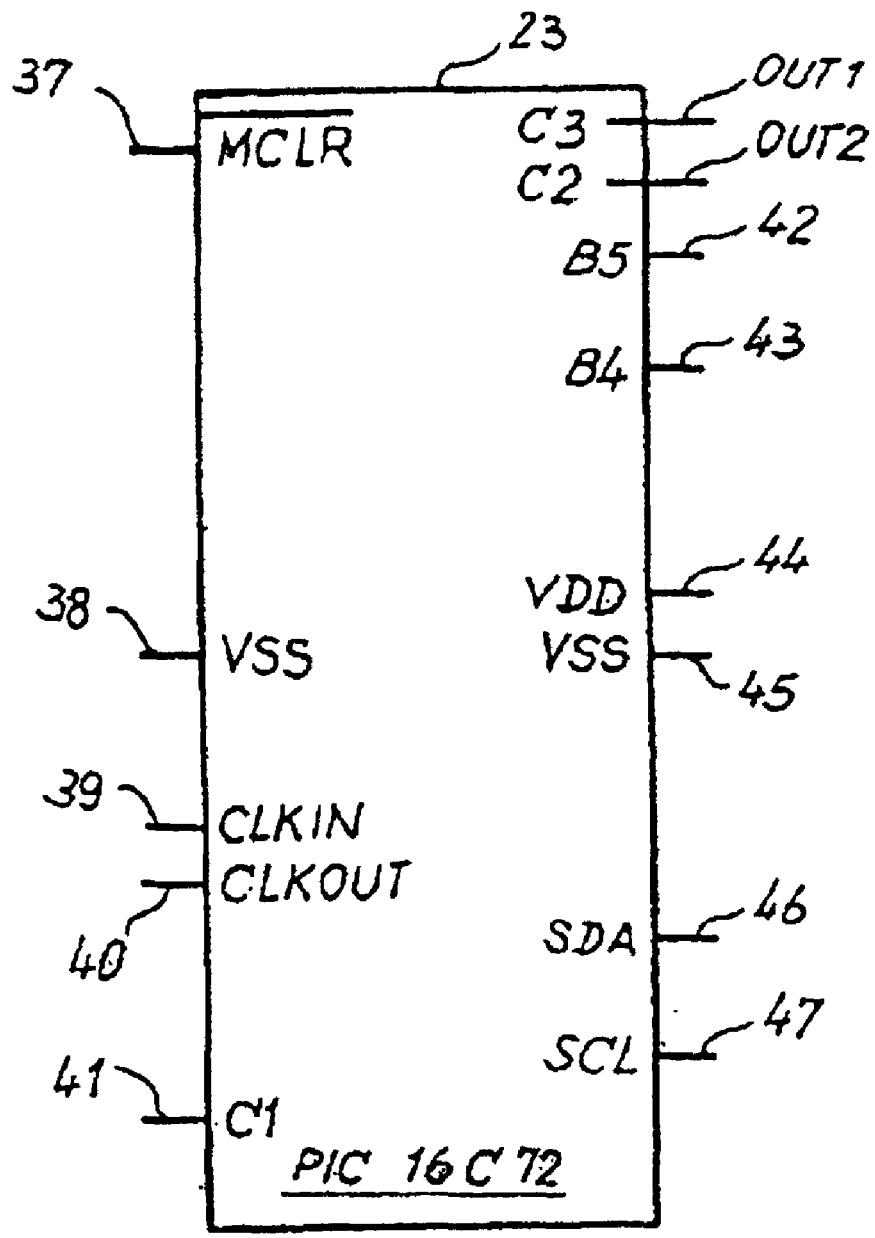
FIG. 2 shows the pin assignment of a $\mu C$ used in the exemplary embodiment, in this case a Microchip PIC 16C72.

FIG. 2 shows the terminals of a µC 23. In this exemplary embodiment, a model PIC 16C72 microcontroller of the MICROCHIP company is used. This is an 8-bit processor. It contains a 16-bit timer and an 8-bit timer, two Pulse Width Modulation (PWM) registers, and multiple interrupt functions. This processor of course represents only one example, but it has proven to be the best mode for the embodiment described.

µC 23 has, among others, terminals MCLR 37, VSS 38, CLKIN 39, CLKOUT 40, C1 41, B5 42, B4 43, VDD 44, VSS 45, SDA 46, and SCL 47.

Figure 3:
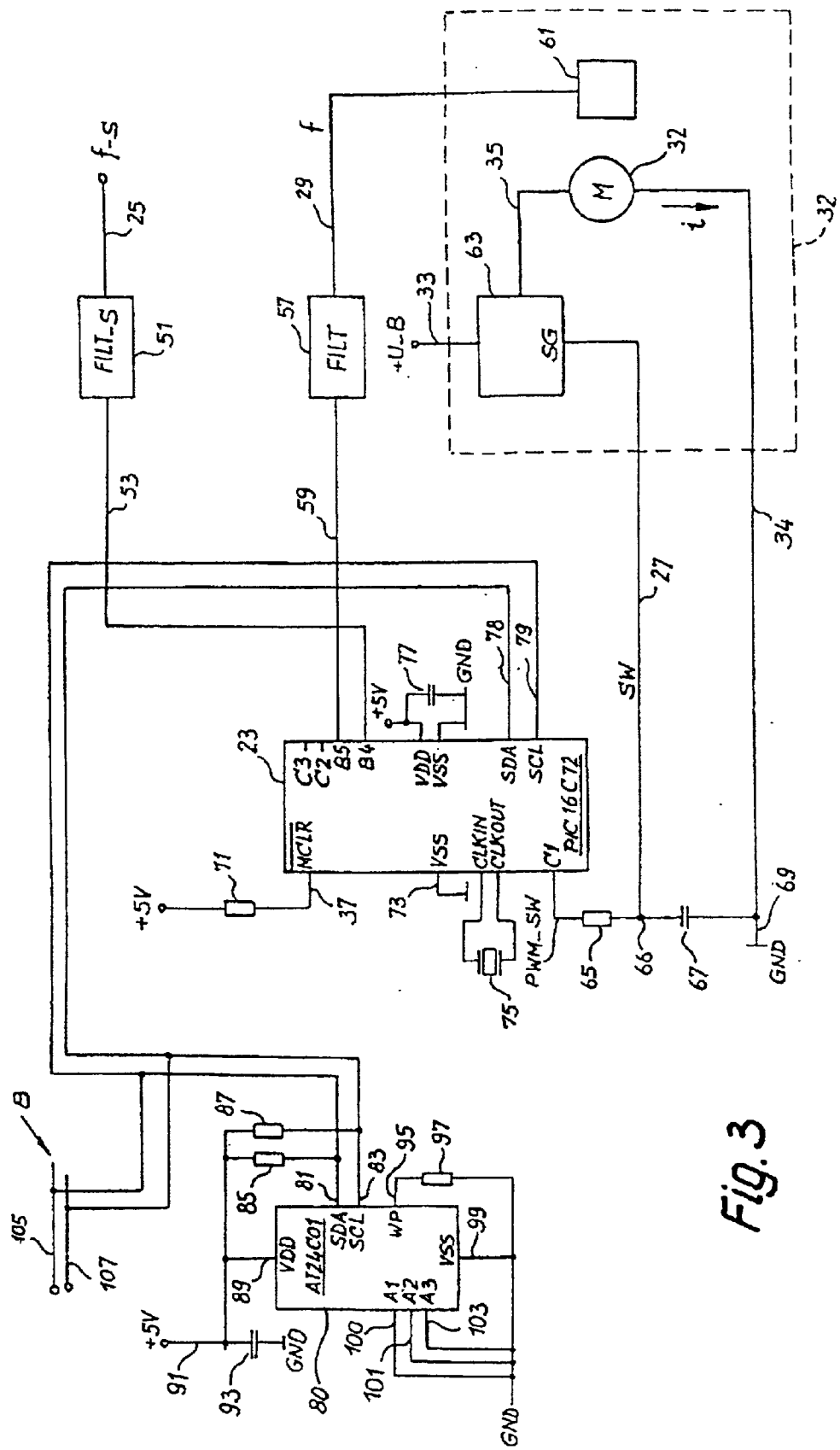
FIG. 3 is a schematic circuit diagram of a preferred embodiment of a motor according to the invention, in this case with one electric motor 32.

FIG. 3 shows a greatly schematized circuit diagram of a preferred arrangement with one electric motor 32.

The terminals of µC 23 are depicted in FIG. 2, and the corresponding reference characters are used again. Terminal MCLR 37 is connected via a resistor 71 to a positive voltage +5V. Terminals CLKIN 39 and CLKOUT 40 are connected to a quartz oscillator 75. Terminal VDD 44 is connected to +5V and terminal VSS 45 to ground GND, and the two terminals are connected to one another through a capacitor 77. µC 23 has two timers TIMER0 and TIMER1 that are depicted schematically in FIG. 1.

Setpoint frequency f_s passes via a line 25 to a filter FILT_s 51, and from there via a line 53 to terminal B4.

Actual frequency f (corresponding to the rotation speed of motor 32), which is sensed by a rotor position sensor 61, passes via a line 29 to a filter FILT 57, and from there via line 59 to terminal B5 42 of µC 23.

An EEPROM 80 has terminals SDA 81, SCL 83, VDD 89, WP 95, VSS 99, A1 100, A2 101, and A3 103. EEPROM stands for Electrically Erasable Programmable Read-Only Memory.

Terminal SDA 46 of µC 23 is connected via a line 78 to terminal SDA 81 of EEPROM 80 and to an external terminal 105.

Terminal SCL 47 of µC 23 is connected via a line 79 to terminal SCL 83 of EEPROM 80 and to an external terminal 107. Terminals 105, 107 provide connection to a communication bus B.

Terminals VSS 99, A1 100, A2 101, and A3 103 of EEPROM 80 are connected to ground GND. Terminal WP 95 is connected via a resistor 97 to ground GND. Terminals SDA 81 and SCL 83 are connected via pull-up resistors 85 and 87, respectively, to +5V. Terminal VDD 89 is connected via a line 91 to +5V and via a capacitor 93 to ground GND.

Motor 32 has an adjusting member SG 63 which influences the magnitude of a current i flowing through motor 32.

Adjusting member 63 is connected via a line 33 to voltage +U_B, and a control output SW is delivered via a line 27 from terminal C1 of µC 23 to adjusting member SG 63 in order to influence the magnitude of current i. A resistor 65 is located between terminal C1 of µC 23 and line 27, and node 66 is connected via a capacitor 67 to ground GND. Resistor 65 and capacitor 67 together form an integration member whose operation will be explained below with reference to FIG. 5.

Mode of Operation

µC 23 receives its operating voltage through terminal VDD 44 at +5V and VSS 45 at ground GND. The supply voltage is protected from voltage spikes and dips by a filter capacitor 77. The clock frequency of µC 23 is generated by means of oscillator 75 connected to terminals CLKIN 39 and CLKOUT 40.

Terminals SDA 46 and SCL 47 of µC 23 serve for serial transfer of data between µC 23 and EEPROM 80 (terminals SDA 81 and SCL 83, respectively, thereon), and to external terminals 105 and 107, respectively, that are connected, for example, to external bus B.

EEPROM 80 receives its voltage via terminal VDD 89, which is connected via line 91 to +5V and is additionally protected by a capacitor 93 from voltage spikes; and via terminal VSS 99 that is connected to ground GND. Write-protect terminal WP 95 is taken to ground GND via resistor 97, so that in this exemplary embodiment EEPROM 80 cannot be written to. For the same reason, terminals A1 100, A2 101, and A3 103, which provide address coding, are also connected to ground GND. In this exemplary embodiment, the parameters are permanently written in EEPROM 80. Variants having an EEPROM 80 that can be written to by μC 23 or via bus B are similarly possible; cf. for example PCT Application PCT/EP99/05186 of the Applicant, dated Jul. 21, 1999 whose US national phase is Ser. No. 09/ 720,221.

The two outputs SDA 81 and SCL 83 are configured as open collector outputs, and are therefore wired to pull-up resistors 85 and 87, respectively.

Setpoint frequency f_s is furnished externally, e.g. from a frequency generator or another motor. Actual frequency f is in this case furnished by sensor 61, which furnishes a constant number of pulses per revolution. Any known type of sensor can be used as sensor 61, e.g. a resolver; a tachogenerator that furnishes an alternating voltage at its output; a Hall generator; or an optical, inductive, or other sensor. Since, in electronically commutated motors, the rotor position is usually sensed by means of one or more Hall generators, the output signal of such a sensor can also be used as the actual frequency, since additional costs for a tachogenerator are then eliminated. The use of a tachogenerator may, however, be advantageous if a high frequency of signal f is desired for the actual frequency, for example if the rotation speed is low, e.g. in the case of a marine diesel with a very low rotation speed.

Filters FILT_s 51 and FILT 57 serve to condition the edges of setpoint frequency f_s and actual frequency f, respectively, so that the presence of an edge at the respective interruptible inputs B5 42 and B4 43 reliably triggers an interrupt. Filters FILT_s 51 and FILT 57 can be configured, for example, as RC members or as Schmitt triggers.

With appropriate signals f and f_s, one or both of filters FILT_S 51 and FILT 57 can also be omitted.

An example of the effect of the filters is shown in FIG. 4.

FIG. 4A shows actual frequency f before it has entered filter FILT 57, and FIG. 4B shows actual frequency f after it has been conditioned in filter FILT 57.

Actual frequency t in FIG. 4A derives, for example, from a Hall generator, and its edges 109 are less steep.

Actual frequency f in FIG. 4B has been conditioned by filter FILT 57. Edges 110 are steep, and can reliably trigger an interrupt in μC 23.

A control output RGL_VAL calculated in μC 23 (FIG. 7) is outputted via terminal C1 41 as a pulse width modulated (PWM) signal PWM_SW. Signal PWM_SW is converted by an RC member comprising resistor 65 and capacitor 67 into an analog voltage approximately proportional to μC-internal control output RGL_VAL, which voltage is designated as control output SW and is delivered to adjusting member SG 63 via line 27. Adjusting member SG 63 controls the delivery of current for motor M 32. Adjusting member SG 63 can be configured, for example, as an analog longitudinal positioner, or as a PWM adjusting member, or in another fashion.

FIG. 5A shows PWM signal PWM_SW from terminal C1 41 of FIG. 3; and FIG. 5B shows, in idealized form, control output SW that is created at node 66 of FIG. 3 by the RC member constituted by resistor 65 and capacitor 67 as the pulse duty factor of PWM_SW decreases.

Depending on pulse duty factor TV_SW of PWM signal PWM_SW of FIG. 5A, control output SW of FIG. 5B has a specific voltage u between 0 and MAX.

Pulse duty factor TV is generally defined as $$TV = t\_on/T \qquad (2)$$

i.e. as the quotient of the time t_on (FIG. 5A) during which the PWM signal is HIGH (here from 121 to 123), and the period T of the PWM signal (here from 121 to 125). The pulse duty factor is indicated as a percentage, and can therefore assume values from 0 to 100 percent.

In FIG. 5A, the pulse duty factor decreases from left to right, so that signal SW in FIG. 5B also decreases from left to right.

Signal SW is delivered to adjusting member SG 63 of FIG. 3 via line 27, so that the motor rotation speed can be controlled by means of pulse duty factor TV_SW.

FIG. 6A shows, purely by way of example, an exemplary embodiment for adjusting member SG 63 of FIG. 3 that serves to control rotation speed n of a motor 137, which is depicted here as a collector motor.

Adjusting member SG 63 comprises a comparator 131 having a positive input 132 and a negative input 133, a triangular generator DG 134, and an npn transistor 135.

From node 66, signal SW is delivered to positive input 132 of comparator 131. Triangular signal u_D generated by triangular generator DG 134 is delivered to negative input 133 of comparator 131. A PWM signal PWM_M is created at the output of comparator 131 and is delivered to transistor 135. Transistor 135 switches between operating voltage +U_B connected via line 33 and motor M 137, which is connected via line 35 and has associated with it a tachogenerator 138 for producing a frequency f proportional to the rotation speed.

FIG. 6B shows examples of profiles for voltages u_D and SW, and FIG. 6C shows a signal PWM_M resulting therefrom with which transistor 135 is switched on and off.

Comparator 131 compares the two signals u D and SW. If control output SW is greater than triangular voltage u_D, then PWM_M signal PWM_M is HIGH; otherwise it is LOW. The pulse duty factor of PWM signal PWM_M is thus controlled by means of the magnitude of control output SW. In FIG. GB, signal SW increases from left to right. As a result, the pulse duty factor of signal PWM_M in FIG. 6C is also increased from left to right.

Since motor 137 also receives more current and therefore more output via transistor 135 when the pulse duty factor of signal PWM_M is higher, the motor rotation speed can be controlled by way of the magnitude of control output SW.

FIG. 29 shows a variant of FIG. 6. Identical or identically operating parts are therefore given the same reference characters as in FIG. 6. The motor is depicted here as a so-called two-phase, two-pulse electronically commutated motor (ECM) 32" which has, as an example, a two-pole permanent-magnet rotor 732. The latter controls, through its magnetic field, a Hall generator 61 which generates signal f and with that signal also controls the commutation of ECM 32". ECM 32' can be constructed, for example, in accordance with DE 23 46 380 C2 and corresponding Müller U.S. Pat. No. 3,873,897. This is, of course, only one example. The invention is similarly suitable for ECMs having a different number of phases and a different number of rotor poles, as is self-evident to one skilled in the art.

The two phases of ECM 32" are labeled 736 and 738. Current i1 in phase 736 is controlled by an npn Darlington transistor 740 with free-wheeling diode 742, and an npn Darlington transistor 744 with free-wheeling diode 746 serves to control current i2 in phase 73B. The emitters of transistors 740, 744 are connected to one another and, through a resistor 74B, to GND.

Transistor 740 is controlled by a port OUT1 of μC 23 via an AND element 750, which has signal PWM_M delivered to its other output from PWM adjuster 63. FIG. 29 schematically shows the shape of that output signal, which comprises square-wave pulses at, for example, 25 kHz. The width of said pulses is determined by the magnitude of the voltage at input 132 of adjuster 63. Transistor 740 becomes conductive only if a logical "1" signal is present both at the output of adjuster 63 and at output OUT1 of µC 23.

Transistor 744 is similarly controlled by a port OUT2 of µC 23 via an AND element 752, which has signal PWM_M delivered to its other input from adjuster 63. Transistor 744 therefore becomes conductive only if a logical "1" signal is present both at the output of PWM adjuster 63 and at output OUT2 of µC 23.

A resistor 754 is located between the output of AND element 750 and the base of transistor 740, and a resistor 756 is present analogously for transistor 744.

As described below with reference to FIG. 13, S310 and S314, outputs OUT1 and OUT2 of µC 23 are switched alternatingly to HIGH and LOW and thereby control which of the two phases 736, 738 is to receive current. The magnitude of currents i1, i2 is determined by the signal at node 66, which determines the pulse duty factor of signal PWM_M, as described in detail in FIG. 6.

Schematic Overview of a Preferred Embodiment of the Program

Figure 7:
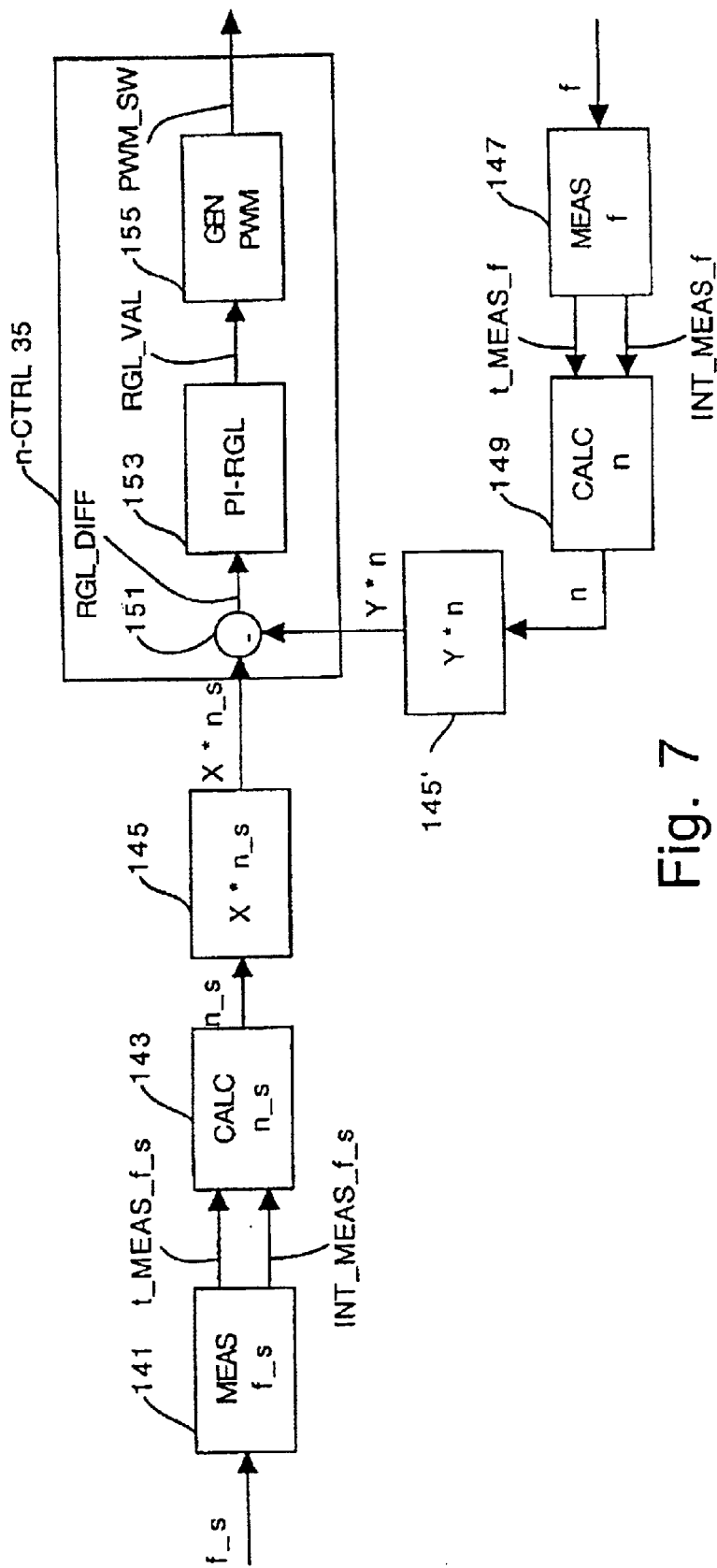
FIG. 7 is a schematized depiction of a control arrangement that makes possible an "electronic gearbox"

FIG. 7 shows an overview of the program executing in µC 23. The program comprises a setpoint measurement function "MEAS_f_s" 141 and a setpoint calculation function "CALC n_s" 143, an actual value measurement function "MEAS f" 147 and an actual value calculation function "CALC n" 149, a "gearbox" 145, and rotation speed controller n-CTRL 35 (FIG. 1). The digital rotation speed controller n-CTRL 35 has in this case a system deviation calculator 151, a PI controller "PI-RCL" 153, and a control output generator "GEN PWM" 155 at whose output signal PWM_SW is generated.

Setpoint frequency f_s is measured in "MEAS f_s" 141. Here the number of edges (110 in FIG. 4) since the last measurement is measured in a variable INT_MEAS_f_3, and the instant of the present measurement is measured in a variable t_MEAS_f_s.

Setpoint calculation function "CALC n_s" 143 calculates therefrom the rotation speed setpoint n_s. This is explained below with reference to FIG. 15.

The measurement of actual frequency f in "MEAS f" 147 and the calculation of actual rotation speed n in "CALC n" 149 occur in a fashion entirely analogous to the measurement of setpoint frequency f_s in "MEAS f_s" 141, and rotation speed setpoint n_s is calculated in "CALC n_s" 143.

In "X*n_s" rotation speed setpoint n_s is multiplied by a factor X, and that product as well as actual rotation speed n is delivered to system deviation calculator 151. If X=2, for example, the result is that twice the value of the measured rotation speed setpoint is delivered to system deviation calculator 151; while if, for example, x=½, a value corresponding to half the rotation speed setpoint is delivered to system deviation calculator 151. "X*n_s" thus implements a gearbox function; it is highly advantageous that factors such as, for example, X=1.733 can also be set in this context.

FIG. 7 also shows, with dashed lines, a variant w-th block 145', in which actual rotation speed n is multiplied by a factor Y. Variant 145 (i.e. X*n_s) is normally preferred, since then all the motors of a system can be of identical design and the gearbox factor X can be set globally according to the same rules.

A system deviation RGL_DIFF calculated in system deviation calculator 151 is delivered to controller function "PI-RGL" 153, which calculates controller value RGL_VAL therefrom. The manner in which this is done is described in detail below with reference to FIG. 18.

Value RGL_VAL is delivered to control output generator "GEN PWM" 155, which converts it (in this example) into a PWM signal PWM_SW that is outputted at output C1 of µC 23 and is described in more detail in FIG. 5. By means of signal PWM_SW, the rotation speed of motor M is controlled so that system deviation RGL_DIFF becomes zero.

General Configuration of the Overall Program; Function Manager

The architecture of the overall program executing in µC 23 will be described below using a preferred exemplary embodiment. The subprograms will then be described individually. They are designed specifically for an inexpensive microcontroller. If an expensive processor is used, other approaches are also possible in the context of the invention, but the version described has the advantage that it can be implemented at very low cost, so that great savings can be realized as compared to a mechanical gearbox.

Figure 8:
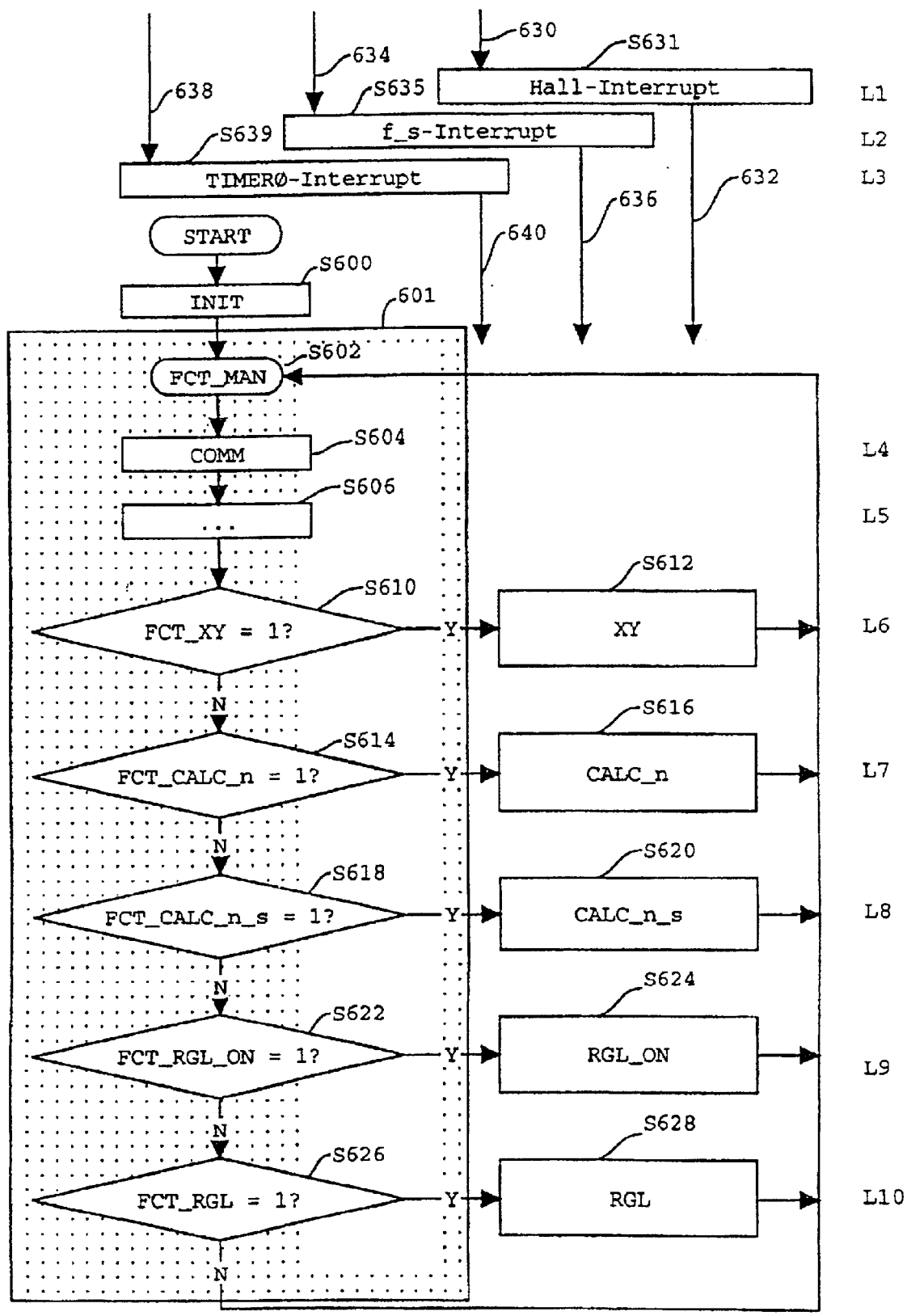
FIG. 8 is a flow chart with an overview of the entire program, here in the form of a so-called function manager.

FIG. 8 shows a flow chart with a preferred embodiment of the overall program executing in µC 23.

At the very top are three interrupt routines—Hall Interrupt S631 (FIG. 13), f_s Interrupt S635 (FIG. 14), and TIMER0 Interrupt S639 (FIG. 12)—which are executed each time the respective interrupt 630, 634, or 638 occurs and which act on the main program via 632, 636, 640. The priority, i.e. the sequence in which the individual program elements are executed, decreases from the top down. The priorities are therefore labeled l L1 through L10 along the right side, L1 having the highest priority.

The main program is depicted below the interrupt routines. After motor 32 is switched on, an internal reset is triggered in µC 23. Initialization of µC 23 occurs in S600. For example, parameters are read out of EEPROM 80 and transferred into the RAM of µC 23.

After initialization, execution branches into a so-called function manager 601 that begins in S602. Function manager 601 controls the execution of the individual subprograms.

Those functions that are time-critical and must be performed at each pass are executed first. These include, for example, a communication function COMM in S604 which performs data transfer between µC 23, EEPROM 80, and external bus terminal B. S606 represents any further time-critical functions that may be present.

Figure 9:
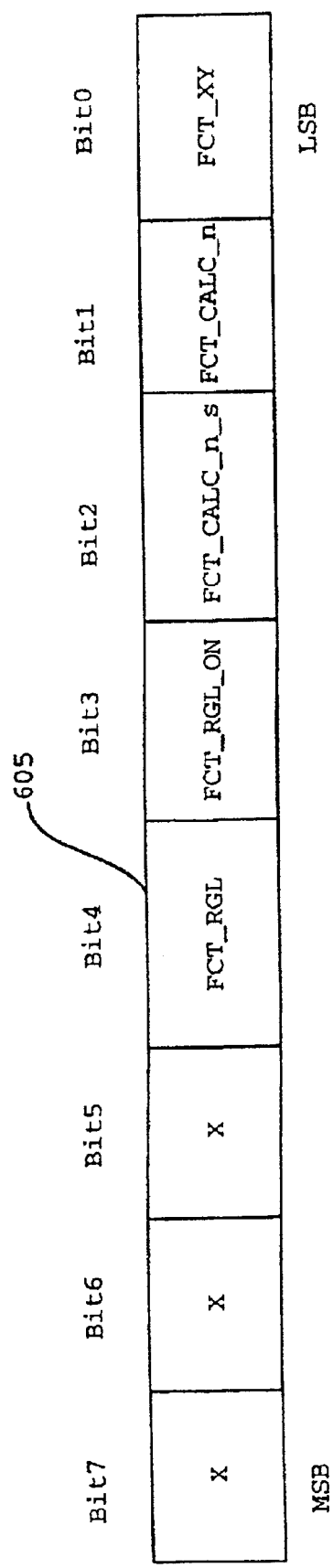
FIG. 9 shows a function register that is used in conjunction with FIG. 8.

FIG. 9 shows an example of a function register 605 in which one bit is reserved for each further function in FIG. 8.

Figure 15:
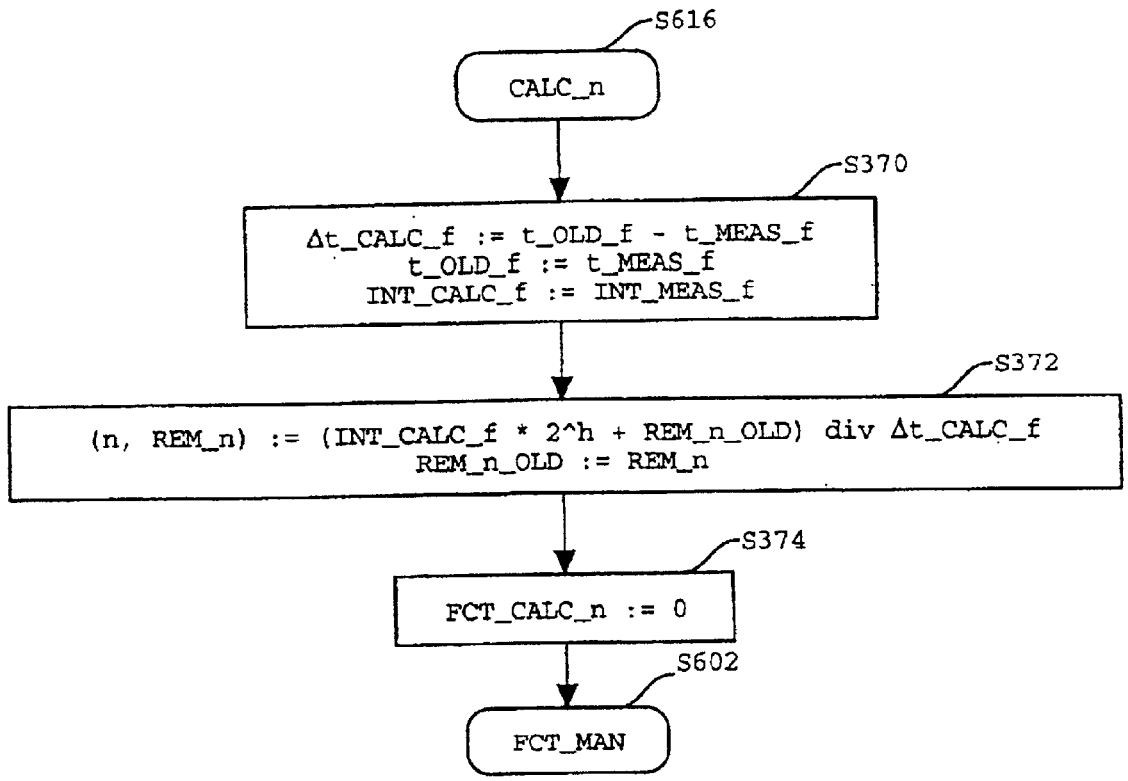
FIG. 15 is a flow chart for a function CALC_n for calculating the instantaneous value of the rotation speed (actual rotation speed)
Figure 16:
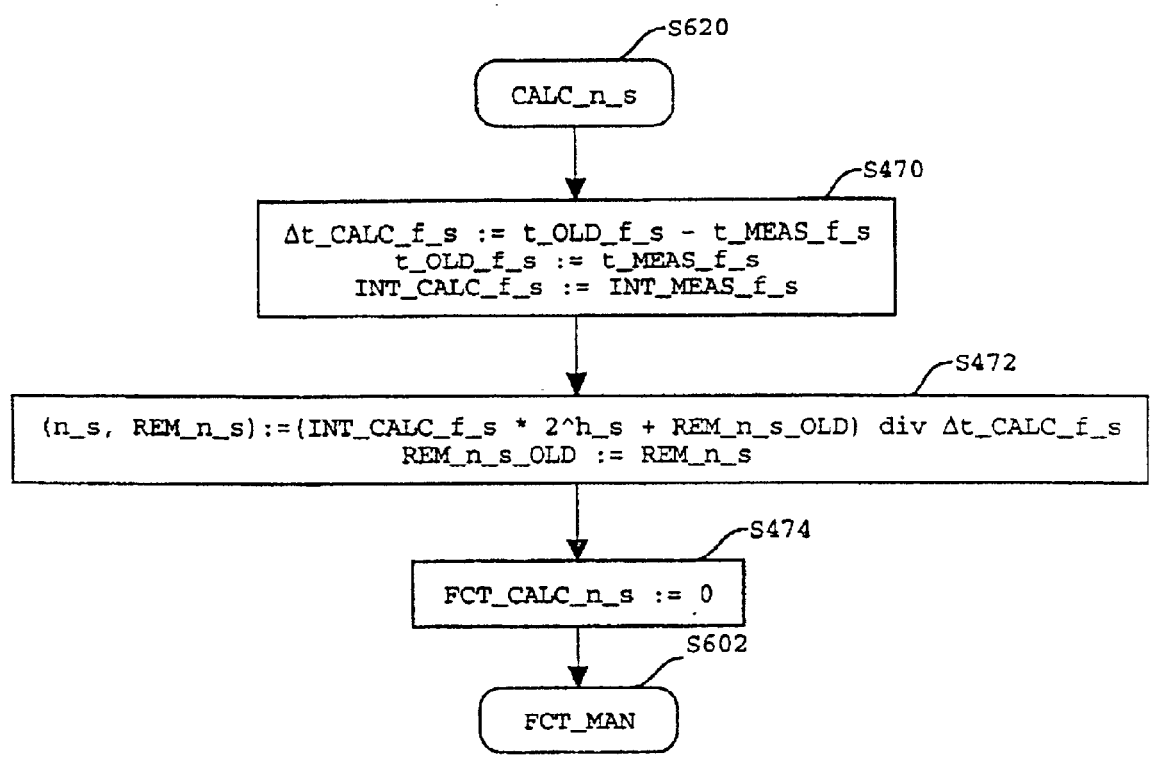
FIG. 16 is a flow chart for a function CALC_n_s for calculating a rotation speed setpoint n_s.
Figure 17:
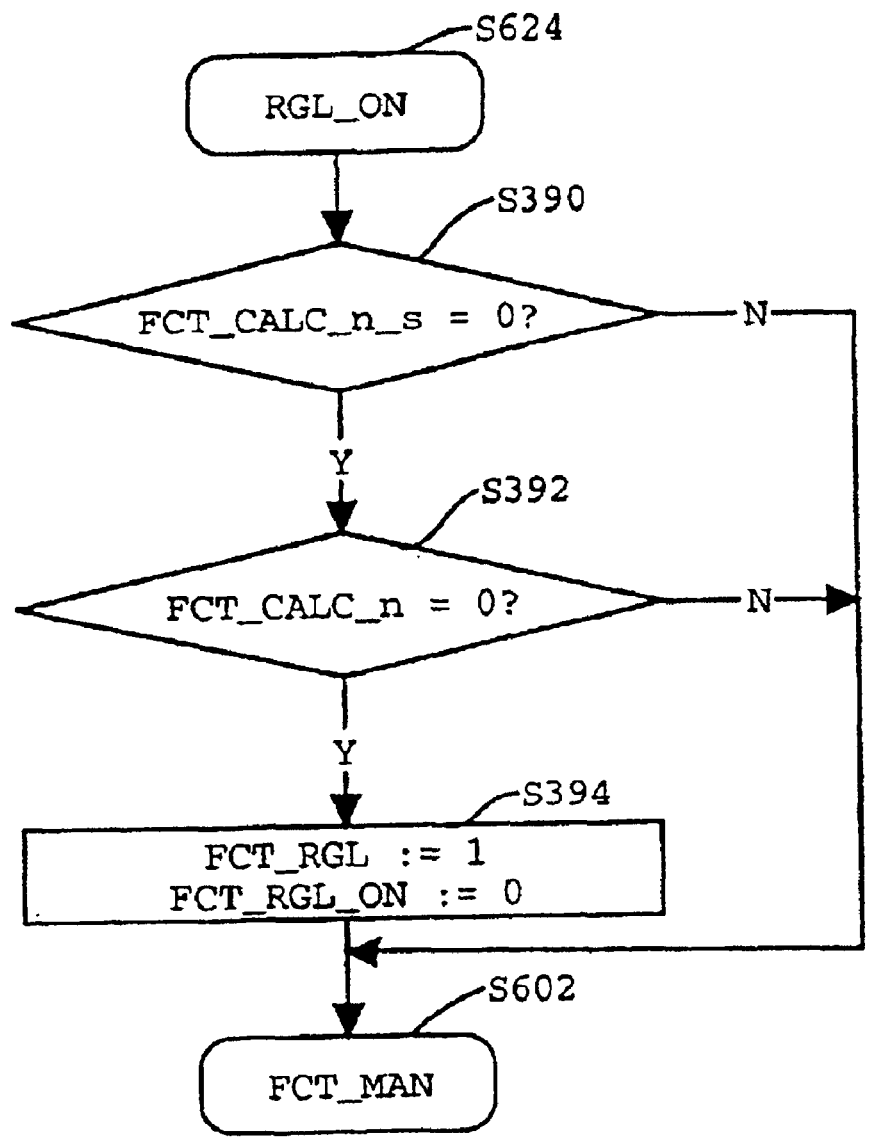
FIG. 17 is a flow chart for a function RGL_ON which determines when the RGL function of FIG. 13 is started.
Figure 18:
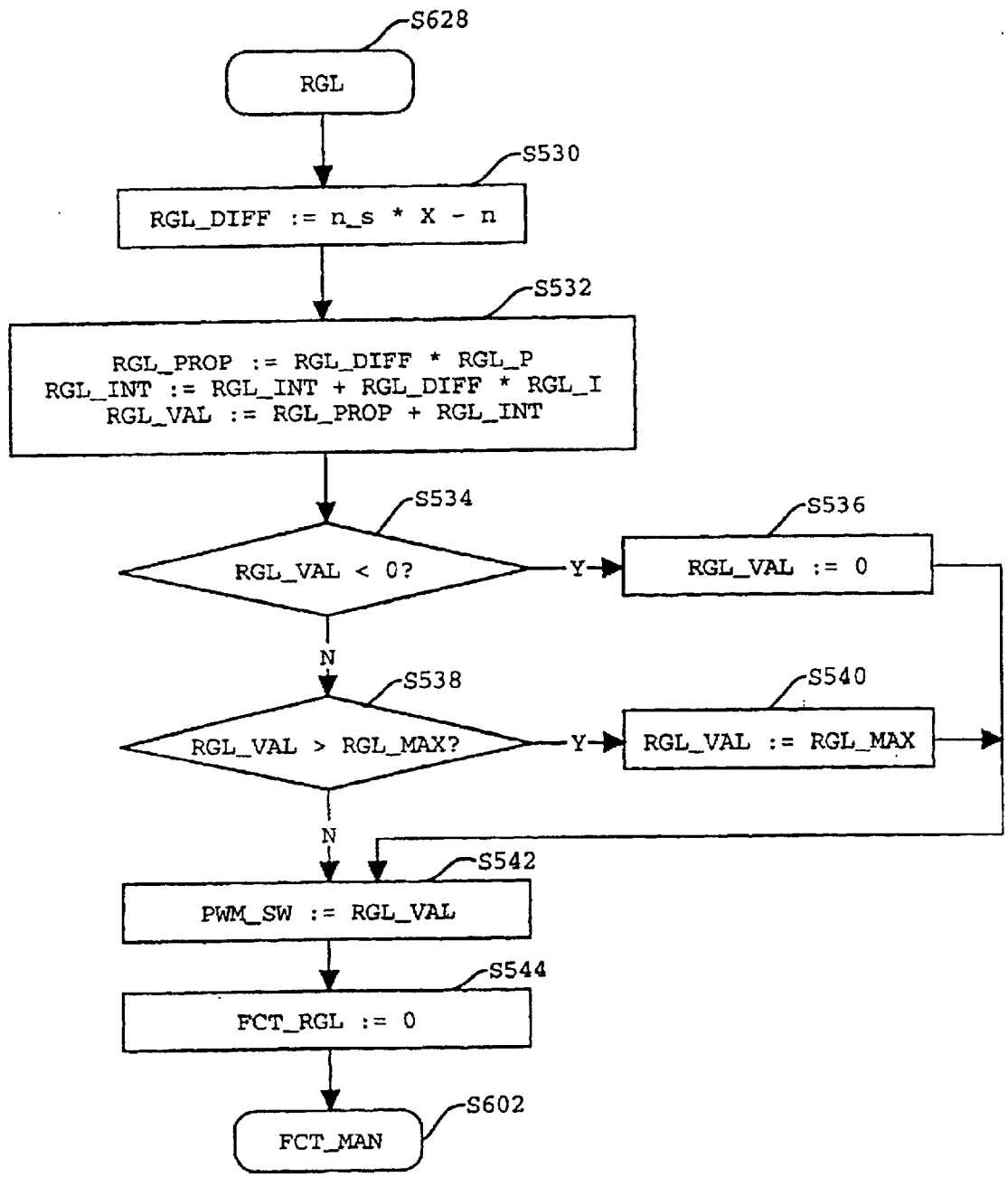
FIG. 18 is a flow chart for the function RGL for regulating the rotation speed; this function makes possible an "electronic gearbox"

In this exemplary embodiment function register 605 is one byte long, and the following request bits, starting with the least significant bit (LSB), are defined for the requestable functions that are explained later:

FCT_XY for any function S612;
FCT_CALC_n for an actual value calculation function CALC_n S616 (FIG. 15);
FCT_CALC n s for a setpoint calculation function CALC_n s S620 (FIG. 16);
FCT_RGL_ON for a controller start check function RGL_ON S624 (FIG. 17);
FCT_RGL for a controller function RGL S628 (FIG. 18).

The remaining bits (bit5 through bit7) are reserved for additional requestable functions that may be integrated into function manager 601 as applicable.

Actual value calculation function CALC n S616 (FIG. 15) serves to calculate actual rotation speed n; setpoint calculation function CALC n_s S620 (FIG. 16) serves to calculate rotation speed setpoint n_s; and controller start check function RGL_ON S624 (FIG. 17) checks whether the conditions exist for initiating the subsequent function RGL S628 (FIG. 18), and requests that function as applicable. Lastly, controller function RGL S628 calculates the new control output RGL_VAL (FIG. 7) and outputs it to adjusting member SG 63 of motor 32.

If a specific requestable function is to be requested by another function or by an interrupt routine, the bit of the requested function in function register 605 (FIG. 9) is set to 1, e.g. FCT_XY=1. If function manager 601 finds no other requestable function with a higher priority during a pass, that function is executed.

Once a requested function has been executed, it sets its own request bit back to 0, i.e. for example FCT XY=0. This allows longer functions—which cannot be executed in one pass because, for example, they would take too long—to be subdivided and processed in multiple calls.

In FIG. 8, after S606 the program checks in a predetermined sequence, beginning with the most important requestable function, as to whether each function's request bit is set. If such is the case for a function, it is executed; and execution then branches back to the beginning FCT_MAN S602 of function manager 601. The sequence in which function register 605 is checked defines the prioritization of the requestable functions. The higher up a function is located in function manager 601, the higher its priority.

The mode of operation of function manager FCT_MAN 601 will be explained with reference to an example. If the program branches, for example, from S610 to S614, S614 then checks whether function register bit FCT_CALC_n= 1, i.e. whether actual value calculation function CALC_n S616 (depicted in FIG. 15) has been requested. If Yes, execution branches to S616 and the rotation speed calculation is performed. Upon termination, rotation speed calculation function CALC_n S616 resets request bit FCT_CALC_n back to 0 (cf. S374 in FIG. 15), and execution branches back to the beginning S602 of function manager 601.

If a request bit was not set in any of the polls up to S626, execution branches without any action back to S602, and functions S604 and S605, which are executed at each pass of function manager 601, are performed again.

The function manager results in optimum utilization of the resources of $\mu$C 23.

Measurement of Actual Value and Setpoint or Target Value

The measurements of actual frequency f and setpoint frequency f_s proceed identically but independently of one another. It could also be said that they proceed in quasi-parallel fashion, "quasi-" meaning that a true parallel processor (which would also be possible in the context of the invention) is not used in this exemplary embodiment. The discussion below will first address the measurement of actual frequency, the actual frequency being an indication of the rotation speed of motor 32 (FIG. 3).

Measurement Principle

Figure 22:
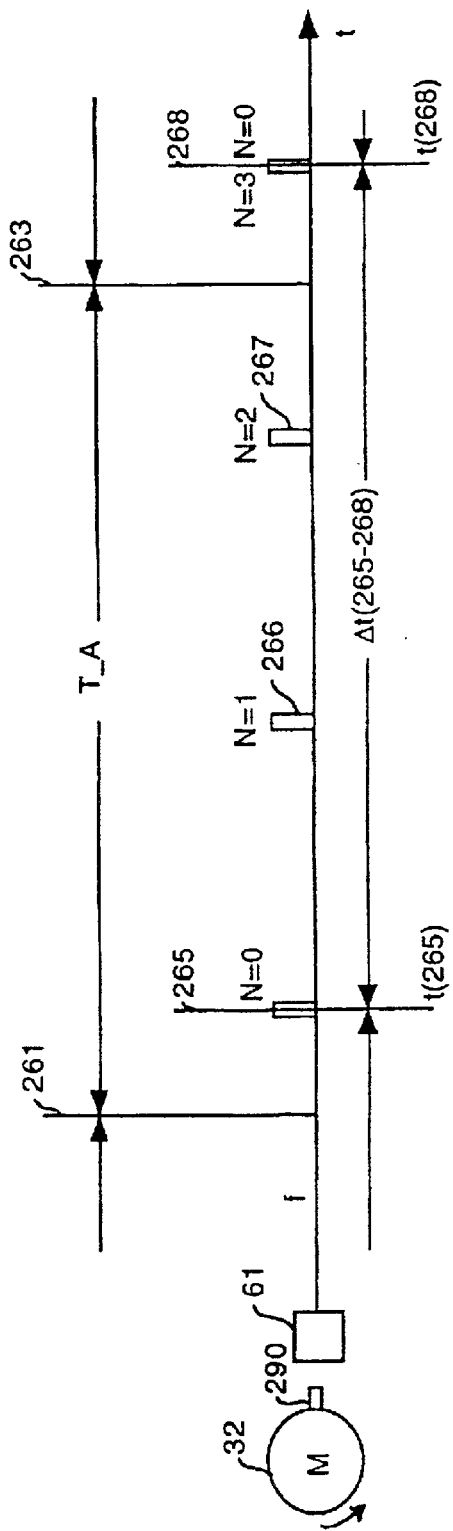
FIG. 22 is a schematic depiction to explain a preferred measurement method in the case of a rotor having a single mark 290.

FIG. 22 shows a rotor 32 having a mark 290, and a sensor 61 for mark 290 that serves as rotor position sensor. Rotor 32 is usually part of a motor M. If this is an electronically commutated motor (ECM), it usually has an rotor position sensor 61 which can then also be used for the present invention.

By means of mark 290, rotor position sensor 61 detects a rotor position signal f. Rotor position signal f comprises pulses at points 265, 266, 267, and 268, etc., one revolution of rotor 32 having taken place between each two pulses. The time axis is labeled t. These pulses represent "events" in the rotation of rotor 32. In FIG. 22, one event (i.e. one pulse) is generated for each rotor revolution.

By means of rotor position signal f, the rotation speed of rotor 32 is measured as described below. At regular intervals T_A a start signal 261, 263, etc. is generated, requesting a new measurement each time.

The start signal at point 261 is followed by pulse 265, and the start signal at point 263 is followed by pulse 266. The measurement takes place between points 265 and 268. The number N of pulses of rotor position signal f occurring after 265 up to and including 268 is measured (i.e. N=3 in this case), as well as the time $\Delta t(265-268)$ required for said pulses. The frequency of rotor position signal f, and thus the rotation speed of rotor 32, can be determined therefrom. At each of points 265, 268 of the measurement, an old measurement is terminated and a new measurement is started. The procedure is therefore such that, at the pulse following start signal 261, 263, an old measurement is terminated and a new measurement simultaneously begun each time.

The number N of pulses can be measured, for example, in a counter, by the fact that in said counter, the value N at the end of each measurement is reset to zero and the counter value N is then incremented by 1 at each pulse.

The time $\Delta t$ can be measured, for example, by taking the difference between the time at which the measurement starts, e.g. t(265) at point 265, and the time at which the measurement ends, e.g. t(268) at point 268.

For example, if t(265)=17.7 ms and t(268)=87.7 ms, then $\Delta t(265-268)=87.7-17.7=70$ ms.

Start signals 261, 263, which occur at fixed intervals T_A, create a measurement window. The measurements do not, however, take place exactly at the instant of the respective start signal; instead, measurement occurs at a suitable point, subsequent to the respective start signal, at which a pulse ("event") of rotor position signal f occurs. If a measurement were made at the instant of the respective start signal, the beginning and the is end of the measurement would take place, in most cases, at a point between two pulses of the rotor position signal. This would result in an inaccurate measurement. Waiting until the next pulse, however, means that complete periods between the pulses are measured, resulting in a great increase in measurement accuracy.

Figure 23:
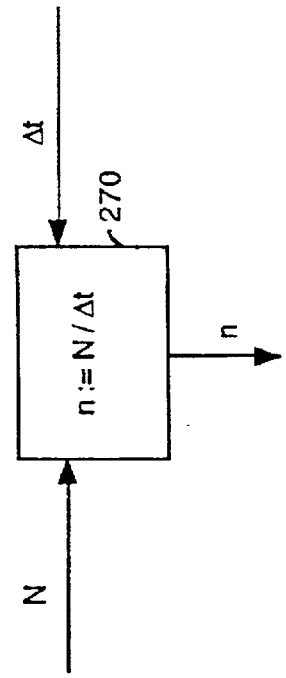
FIG. 23 is a schematic depiction of a rotation speed calculation function.

FIG. 23 schematically shows a calculation of rotation speed n in a rotation speed calculation function 270. Function 270 receives as input, at time intervals having an average duration T_A, the number N of pulses and the time $\Delta t$ required for that number N. Function 270 calculates therefrom a rotation speed datum n as the quotient of number N and time $\Delta t$:

$$n=N/\Delta t \qquad (3)$$

Incorporating the Modulo Function into the Measurement

Figure 24:
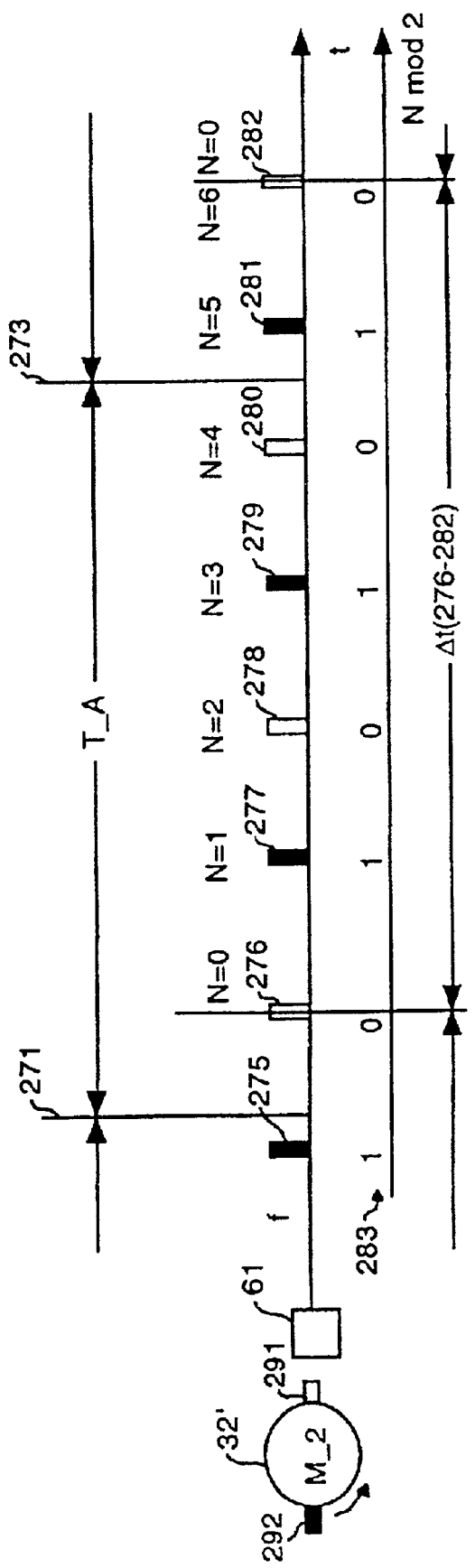
FIG. 24 is a schematic depiction of a preferred manner of measurement in the case of a rotor having two marks 291 and 292.

FIG. 24 shows rotor 32' (of a motor M_2) having two marks 291 and 292, and rotor position sensor 61. Marks 291 and 292 are offset by approximately 180° mech.

Rotor position 61 senses a rotor position signal f by means of marks 291 and 292. Rotor position signal f has pulses resulting from mark 291 (shown in solid white) at points 276, 278, 280, and 282, and pulses resulting from mark 292 (shown in solid black) at points 275, 277, 279, and 281. Between each two "white" pulses and between each two "black" pulses, rotor 32 has rotated once.

Since the pulses generated by marks 291 and 292 cannot be distinguished, it may be stated more generally that one complete revolution of rotor 32 takes place between each pulse and the next pulse but one (e.g. between N=1 and N=3).

The following considerations underlie the measurement of rotation speed n of rotor 32, in FIG. 24:

Marks 291, 292 can never be arranged absolutely symmetrically. If it is assumed that mark 291 is located at 0° mech., mark 292 would need to be located exactly at 180° mech. Due to mechanical defects, however, it may be positioned at, for example, 183° mech. This would result, for the case of a measurement that begins at point 276 (mark 291) and ends at point 281 (mark 292), in a measurement error, since the angular range being measured is then not an exact multiple of 180° mech.

To solve this problem, only complete revolutions are measured in each case in FIG. 24; i.e. measurement always takes place between marks of the same type, so that an exact multiple of 360° mech. is always measured. The measurement that begins at 276 (i.e. after starting pulse 271) therefore ends not at point 281 but at point 282, which is the next point after start signal 273 at which one complete revolution (considering the measurement to have started at point 276) has once again taken place.

This condition can be described mathematically using the MODULO (mod) function; for example, $$N \bmod 2 = 0 \qquad (4)$$

means that when the value N is divided by 2, a remainder of 0 is left. For example, 0 mod 2=0, 1 mod 2=1, 2 mod 2=0, 3 mod 2=1, etc. Similarly, 0 mod 4=0, 1 mod 4=1, 2 mod 4=2, 3 mod 4=3, and 4 mod 4=0, etc.

In FIG. 24, "N mod 2" appears at 283 below pulses 275 through 282, and a measurement ends/starts, for example, only if a measurement is requested by means of a start signal 271, 273 and additionally if the condition N mod 2=0 is met. Stated more generally, in FIG. 24 the value of N mod 2 must be the same at the beginning and at the end of the measurement.

If a rotor has a number of marks A, the condition stated in equation (4) is then generally $$N \bmod A = 0$$

or $$N \bmod A = \text{const.} \qquad (5)$$

The variable A will be referred to hereinafter as MOD_f, i.e. A=MOD_f, and equation (5) then becomes $$N \bmod \text{MOD\_f} = 0$$

or $$N \bmod \text{MOD\_f} = \text{const.} \qquad (5a)$$

The first mark either can be selected by means of a particular signal, or the first measured signal can be selected as a pulse with N=0. This will be clarified even further in the explanation referring to FIG. 13.

The measurement thus occurs either, as shown in FIG. 24, between "white" pulses or, as depicted on the right side of FIG. 15, between "black" pulses. In the example of FIG. 24, the measurement is accomplished between pulses 276 and 282. N=6 pulses are counted in this case, and the time offset between pulses 276 and 282 is ascertained and equals Δt(276–282). A rotation speed datum n is then calculated from these two values using equation (3).

Let it be emphasized that in reality there are no "white" or "black" pulses; rather these are a didactic aid for explanation of one aspect of the invention.

What Happens when Interference Pulses Occur?

Figure 25:
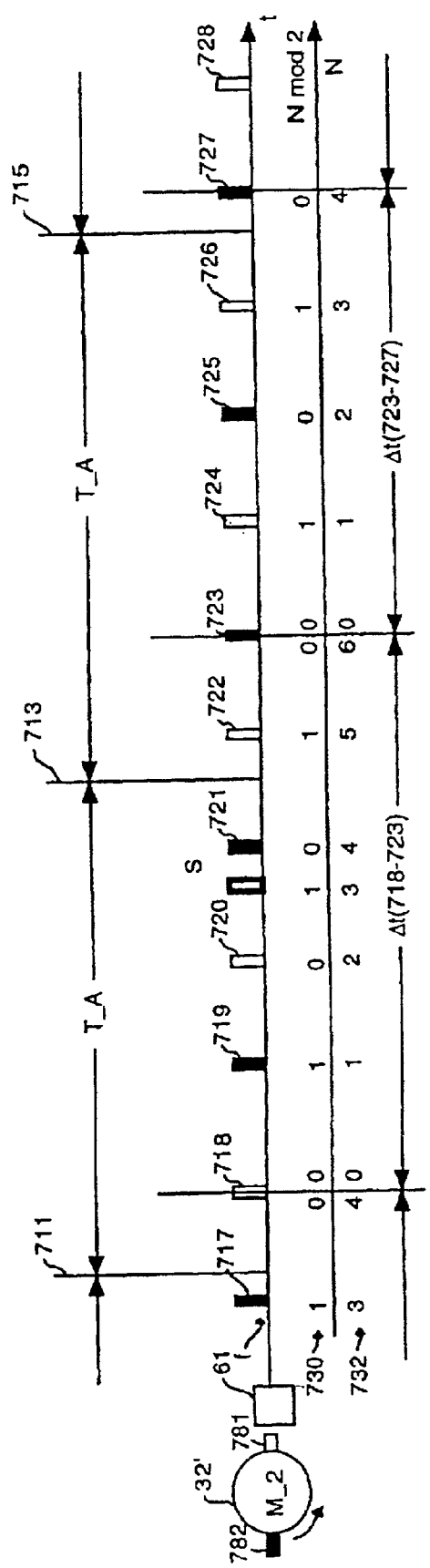
FIG. 25 is a schematic depiction of a measurement analogous to FIG. 24 in which an interference signal S occurs, for explanation of the operations occurring in that context.

FIG. 25 shows, by analogy with FIG. 24, a rotor 32 having two marks 781 and 782, and rotor position sensor 61. Rotor position signal f comprises events in the form of pulses at points 717, 718, 719, . . . , 728. The pulses are generated alternately by white mark 781 and black mark 782 as the latter rotate past rotor position sensor 61, and are therefore, for better comprehension, depicted in white and black. In addition, an interference pulse S occurs between pulses 720 and 721. Control signals 711, 713, and 715 for requesting a measurement are also depicted.

Beneath the pulses, the value of counter N for the number of pulses is indicated in row 732, and the result of the calculation of N mod 2 is shown in row 730.

A measurement normally ends/begins whenever a measurement is requested by means of a control signal 711, 713, or 715, and the value of N mod 2 is also equal to zero, i.e. when rotor 32' has rotated an integral multiple of one revolution since the last measurement.

The result of interference pulse S is that in the context of the measurement in the time period Δt(718–723), it is assumed that rotor 32' has completed one entire revolution between pulses 720 and 721, even though it has completed only half a revolution. As a result, after control signal 713, measurement occurs not at the "white" signal 722 but at the "black" signal 723, since after interference pulse S, it is no longer at the "white" pulses but at the "black" pulses that N mod 2 has a value of zero.

Measurement is already proceeding correctly again in the following time period Δt(723–727), however, since measurement is now occurring at each of the "black" pulses. What occurs as a result of interference pulse S is therefore a displacement of the position of rotor 32' at which measurement takes place. The same would be true if a pulse were missing. The measurement method thus continues to work correctly after an incorrect signal S, and once again measures a multiple of one complete revolution. This represents an important advantage of this embodiment.

Figure 10:
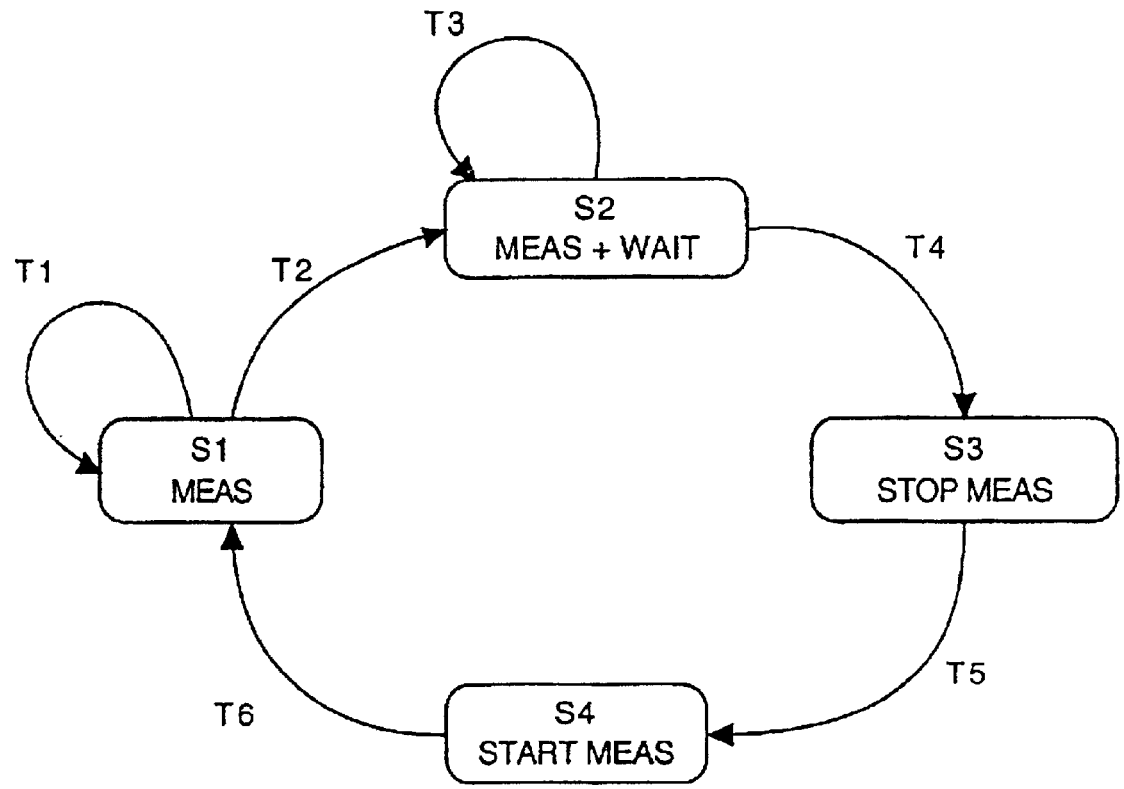
FIG. 10 is a state diagram for a preferred measurement method for measuring a frequency signal.

FIG. 10 shows a state diagram for measurement of the actual frequency. The state diagram comprises four states S1, S2, S3, and S4, and six transitions T1, T2, . . . , T6.

Each transition has an event and an action associated with it.

Table 1 below shows the associated event and associated action for each transition.

| Transition | Event | Action |
|---|---|---|
| T1 | Interrupt due to edge of signal f | Read and store TIMER1, increment INT_CNT_f |
| T2 | Interrupt due to TIMER0 after time T_A | Enable actual value and setpoint calculation and controller |

-continued

| Transition | Event | Action |
| --- | --- | --- |
| T3 | Interrupt due to edge of signal f | Read and store TIMER1, increment INT_CNT_f |
| T4 | INT_CNT_f mod MOD_f = 0 | Calculate t_MEAS_f, INT_MEAS_f, start CALC n |
| T5 | Instantaneous | None |
| T6 | Instantaneous | Prepare for new measurement |

Figure 11:
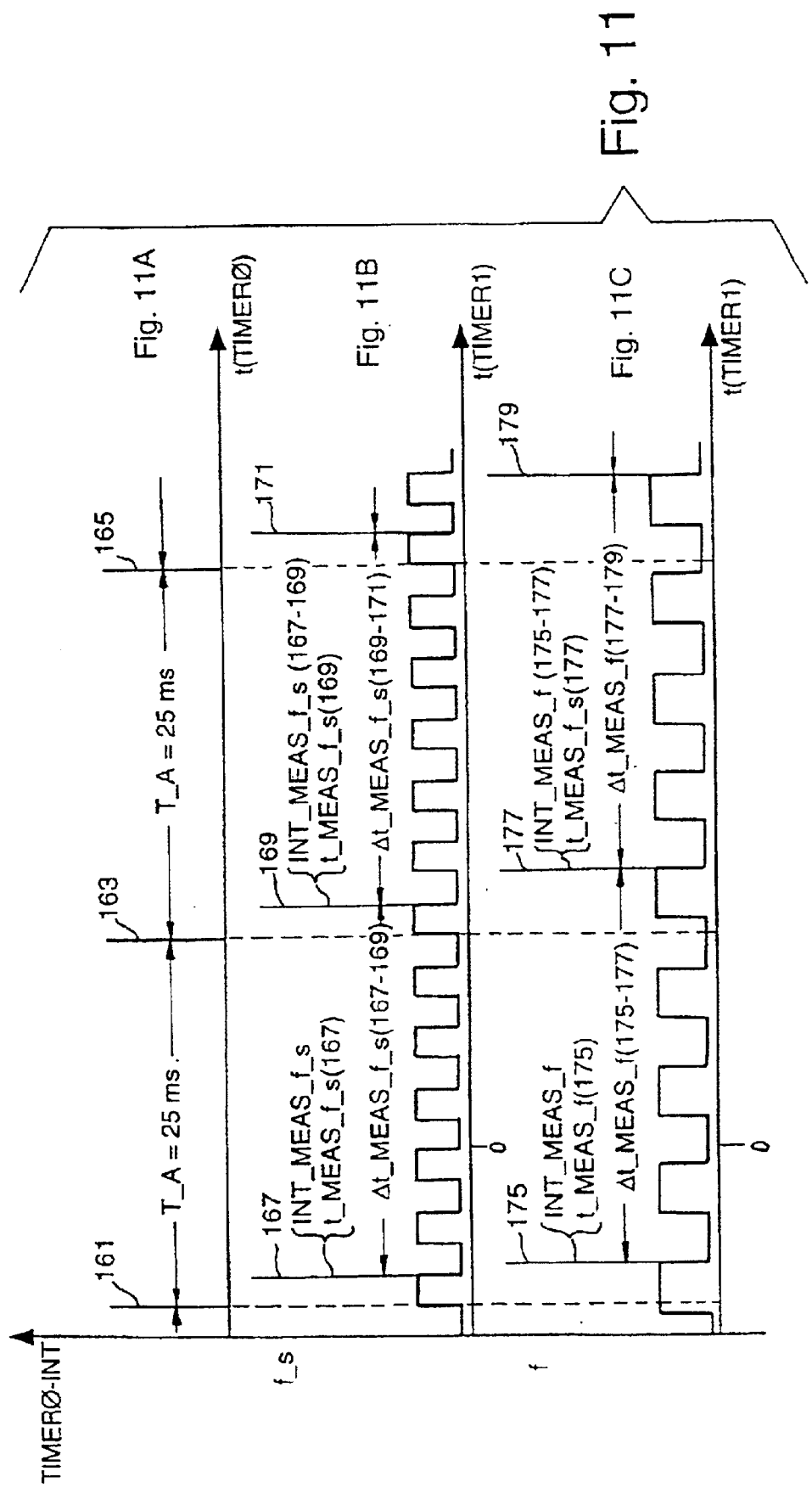
FIG. 11 is a diagram showing, by way of example, the quasi-simultaneous measurement of a setpoint frequency f_s and an actual frequency f.

FIG. 11 shows a related diagram with an example of a procedure for measuring setpoint frequency f_s and actual frequency f.

FIG. 11A shows interrupts 161, 163, 165 of a timer TIMER0 (in µC 23) which are triggered in each case after a time T_A, e.g. T_A=25 ms.

FIG. 11B shows setpoint frequency f_s which is delivered to µC 32, e.g. from frequency generator 20 (FIG. 1). At each of points 167, 169, and 171, the two variables INT_MEAS_f_s (for the number of edges since the last measurement) and t_MEAS_f_B are forwarded to the setpoint calculation function along with the instant of the present measurement determined by means of timer TIMER1. The numbers in parentheses designate the particular instant or time range to which the particular value applies. At instant 169, for example, the value INT_MEAS_f_s(167–169) which contains the number of edges in the range from 167 to 169, and the value t_MEAS_f_s(169) which contains the instant of the measurement at 169, are forwarded to setpoint calculation function CALC_n_s S620 (FIG. 8).

FIG. 11C shows, by analogy with FIG. 11B, actual frequency f that is detected by rotor position sensor 61. INT_MEAS_f and t_MEAS_f are determined at points 175, 177, and 179.

The frequency measurement procedure will now be explained with reference to FIG. 10, Table 1, and FIG. 11. The measurements of setpoint frequency f_s and actual frequency proceed according to the same pattern. The measurement principle will therefore be explained first with reference to the measurement of actual frequency f.

Measuring Actual Frequency f

At instant t=0 selected arbitrarily in FIG. 11, the actual value measurement function is in state S1.

Figure 13:
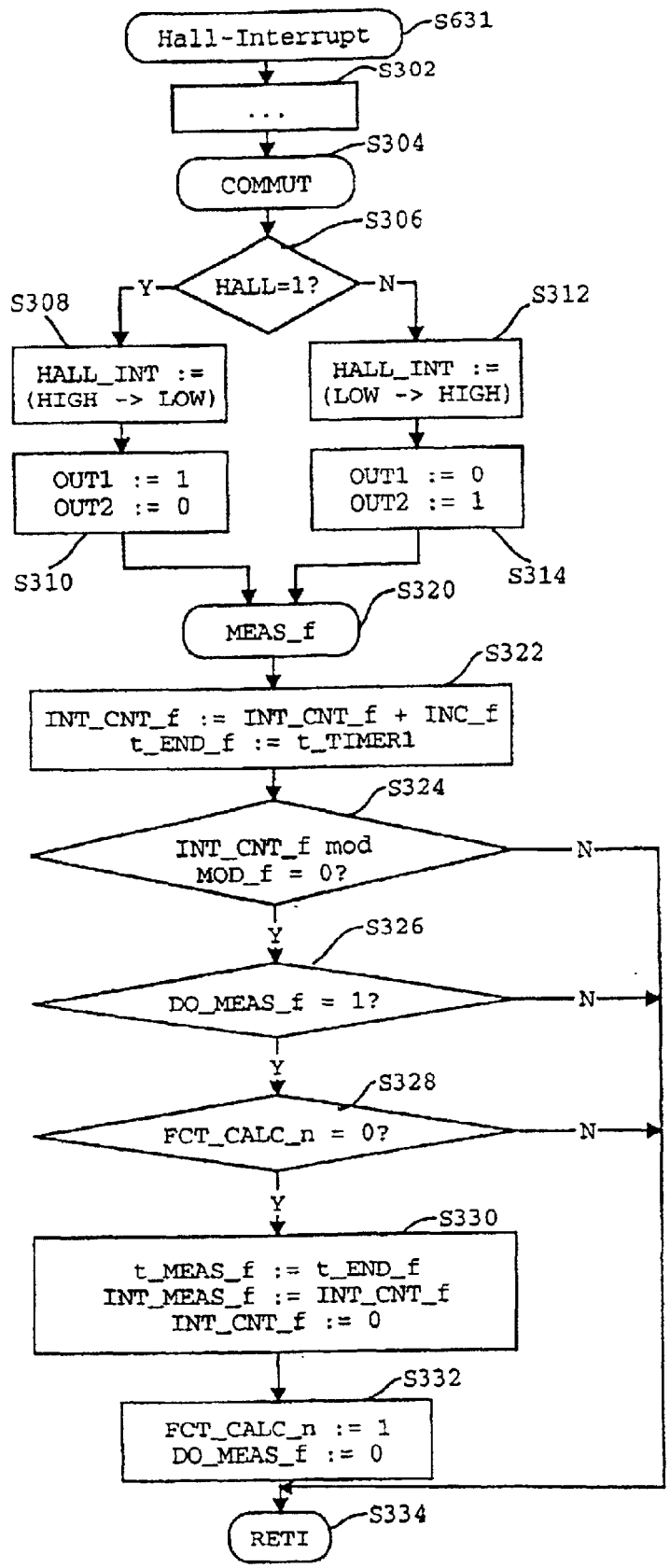
FIG. 13 is a flow chart for a function Hall Interrupt.

At each edge 110 (FIG. 4B) of f, a Hall interrupt 630 (FIG. 8) is triggered, with the following results:

Hall interrupt routine S631 (FIG. 13) is triggered by Hall interrupt 630;

in Hall interrupt routine S631, counter INT_CNT_f for the number of edges is incremented by a value INC_f, e.g. INC_f=1 (S322 in FIG. 13);

the instantaneous value of ring counter TIMER1 is stored in Hall interrupt S631 (S322 in FIG. 13).

In the state diagram (FIG. 10), this is depicted as transition T1 from state S1 to S1. The event here is a Hall interrupt 630 triggered by an edge 110, and the action consists in counting edge 110 in edge counter INT_CNT_f, and storing the instantaneous value of ring counter TIMER1.

A different event triggers transition T2 from state S1 to state S2. The event is an occurrence of a TIMER0 interrupt triggered by timer TIMER0. TIMER0 triggers a TIMER0 interrupt 683 at defined intervals T_A (FIG. 11A), e.g. at points 161, 163, 165. In the associated interrupt routine TIMER0 Interrupt S639 (FIGS. 8 and 12), actual value calculation, setpoint calculation, and the controller are enabled. TIMER0 defines successive windows having a width T_A.

The actual measurement of INT_MEAS_f and t_MEAS_f will then take place. As is apparent from points 175, 177, and 179, the measurement in question takes place not precisely at instants 161, 163, and 165 when requested, but at a suitable instant that is usually slightly later in time than the instant of the request.

Edges 110 of signal f are also sensed in state S2, and at each edge 110 a transition T3 from S2 to S2 (analogous to T1) takes place, in which the instantaneous value of ring counter TIMER1 is read out and stored, and edge counter INT_CNT_f is incremented.

One further condition must be met in order for values INT_MEAS_f and t_MEAS_f finally to be measured. The poles of a permanent-magnet rotor having, for example, four poles usually do not have an extension (pole width) of exactly 90° mech., but deviate slightly therefrom. The sum of all the pole angles always, however, equals 360° mech. It is therefore advantageous, for example in the context of a measurement with Hall sensors, to measure only every complete revolution, i.e. every fourth edge in the case of a four-pole rotor, since this ensures that measurement always takes place exactly at the same point on rotor 32. For a more detailed explanation, please see the description of FIG. 24.

The number of edges 110 of signal f is counted in variable INT_CNT_f, and the condition that, in the case of a four-pole rotor, a multiple of complete revolutions is always measured can be met, based on the description of FIG. 24 and equation (5), if $$\text{INT\_CNT\_f mod } 4=0 \tag{5}$$

or alternatively if $$\text{INT\_CNT\_f mod } 3=0;$$

in the latter case, measurement always occurs, at the earliest, after two complete revolutions or a multiple thereof. If INT_CNT_f mod 12=0, measurement would occur at the earliest after three complete revolutions, etc. The dynamics of a controller would thereby be impaired, however.

For a six-pole rotor, it would correspondingly be possible to work with, for example, INT_CNT_f mod 6=0, or with INT_CNT_f mod 12=0.

Therefore, if the number of edges is a multiple of MOD_f (in this case MOD_f=4), in FIG. 10 a transition T4 from S2 to S3 takes place; the number of edges sensed since the last measurement, which is stored in INT_CNT_f, is stored in INT_MEAS_f (S330 in FIG. 13); and the instant of the present measurement is stored in t_MEAS_f. The values INT_MEAS_f and t_MEAS_f are then transferred to actual rotation speed calculation function CALC_n S616, which is depicted in FIG. 15.

In FIG. 11, for example, if after TIMER0 interrupt 163 at actual frequency f a multiple of MOD_f=4 edges—i.e. in this case, for example, eight edges (8 mod 4=0)—has been sensed at instant 177, then the number of edges since the last measurement is stored in INT_MEAS_f(175–177) for instant 177, and instant 177 of the present measurement is stored in t_MEAS_f(177).

From the present value t_MEAS_f(177) and the stored value t_MEAS_f(175) of the last measurement, it is possible to determine the time Δt_MEAS_f(175–177) required for the edges counted in variable INT_MEAS_f(175–177).

An alternative possibility for determining the time Δt_MEAS_f is to reset the time to zero at the beginning of each measurement. This can be done, for example, by setting timer TIMER1 to zero. At the end of the measurement, the time then corresponds to the value Δt_MEAS_f. As a result, INT_MEAS_f and Δt_MEAS_f are available directly at points 175, 177, and 179. A disadvantage of resetting TIMER1 is the difficulty of then using it simultaneously for other measurements, so that further counters may be required; this is not excluded, however, in the context of the present invention.

From state S3, in which the last measurement is completed, an instantaneous transition T5 leads to state S4, in which a new measurement begins.

From state S4 an instantaneous transition T6 leads to state S1, and the frequency measurement procedure is once again in the initial state S1. During T6, the next measurement is prepared; for example, counter INT_CNT_f (for the number of edges 110) is reset back to zero.

Measuring Setpoint Frequency f_s

The TIMER0 interrupts 638 at points 161, 163, and 165 request both an actual frequency measurement and a setpoint frequency measurement. The measurement of setpoint frequency f_s proceeds in conformity with the measurement of the actual frequency, which is evident from the flow charts that follow.

The designations of the variables for setpoint acquisition are identical to those for actual value acquisition, except that an "_s" suffix is added; for example, INT_MEAS_f_s rather than INT_MEAS_f.

It may once again be advisable to measure a multiple of a fixed number of edges when defining a setpoint frequency f_s. For example, deviations may occur within one period of setpoint frequency f_s. A measurement of, for example, at least two edges in each case may therefore be advantageous. Edge counter INT_CNT_f_s must then be checked using INT_CNT_f_s mod 2=0.

Measurement as defined in FIGS. 10 and 11 has several advantages.

With interrupt-based measurements, the rotation speed can be determined by measuring the time since the previous interrupt (either at each interrupt or after a fixed number of interrupts) and calculating the rotation speed therefrom. This means that as the rotation speed increases, new measured values that must be processed arrive with increasing frequency. At very high rotation speeds, this would result in an overload of μC 23 so that individual measured values would not be taken into account.

With the present measurement method, a new measurement is initiated each time at defined intervals T_A. The load on μC 23 is thus the same at all rotation speeds and frequencies.

The present method moreover has the advantage that when signals f and f_s are measured, measurement occurs at least up to the next interrupt. Measurement therefore does not occur at some instant that lies, for example, in between two edges; instead, measurement always takes place from edge to edge, greatly increasing measurement accuracy.

A further increase in measurement accuracy is obtained by always measuring a multiple of MOD_f or MOD_f_s edges, thereby eliminating, for example, measurement errors resulting from magnetization defects in a permanent-magnet rotor or from symmetry errors in the setpoint frequency definition. This means, for example in the case of a four-pole motor, that a measurement takes place at the earliest at the fourth, eighth, 12th, etc. edge, i.e. whenever X mod 4=0 (with a four-pole rotor, four edges 110 are generated for each revolution).

An additional great advantage is the fact that both the actual value measurement and the setpoint measurement are started at each expiration of a time T_A, since the results of the two measurements are thus available to controller function RGL practically simultaneously. If a measurement were made after each edge, the signal would be measured more often as the frequency increased; this would be less favorable in terms of downline processing.

The use of the same timer (TIMER1) for measuring f and f_s is extraordinarily advantageous, since an inaccuracy in the timer does not result in any inaccuracy in the time ratio between the measurements of f and f_s. Frequencies f and f_s are thus measured with the same time track. A measurement procedure of this kind very advantageously makes possible frequency-controlled rotation speed control with a gearbox function. A measurement of this kind using the same timer is described below with reference to an example.

TIMER1 is preferably configured as a ring counter that runs continuously.

Flow Charts for Measurement of f AND f_s

Figure 12:
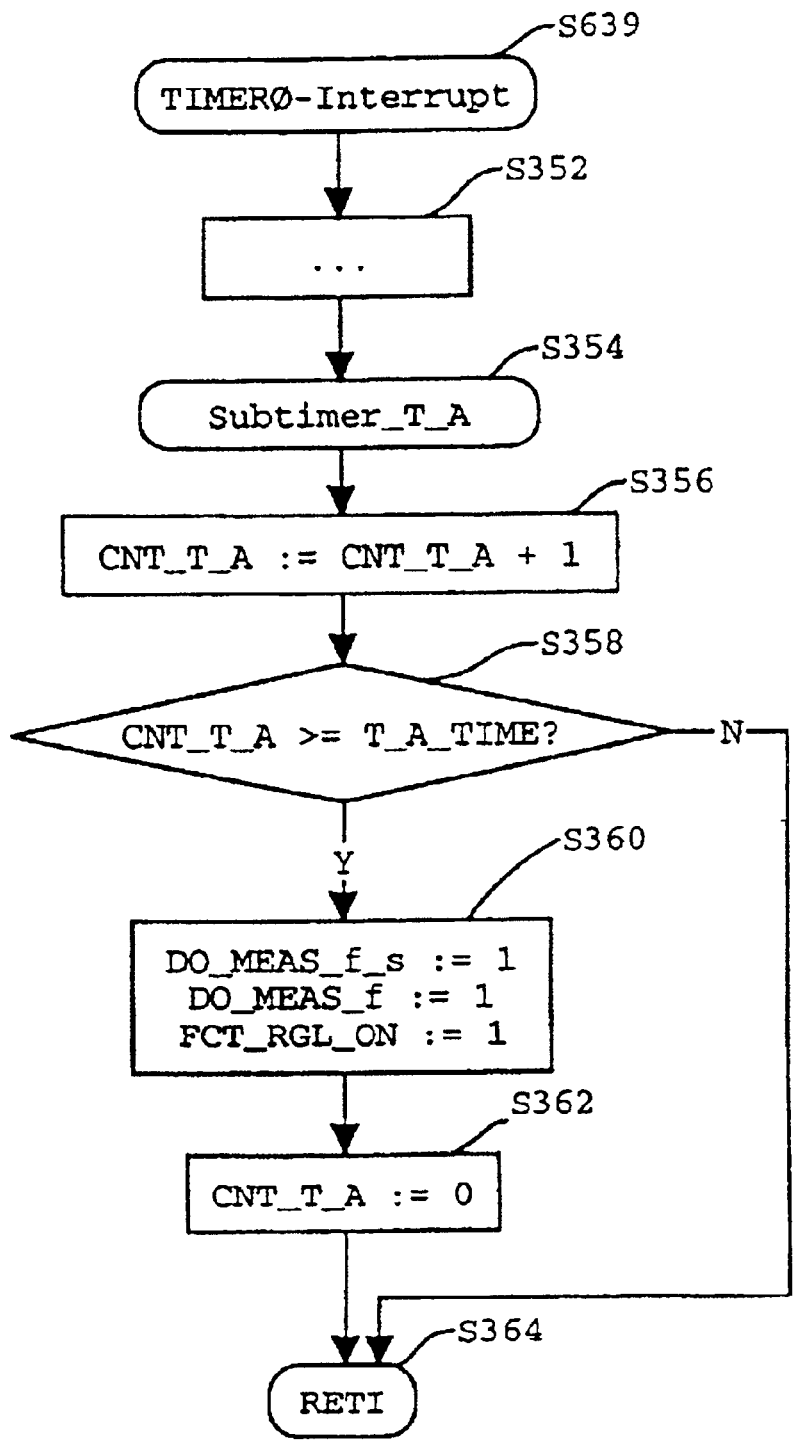
FIG. 12 is a flow chart for a function TIMER0 Interrupt.
Figure 14:
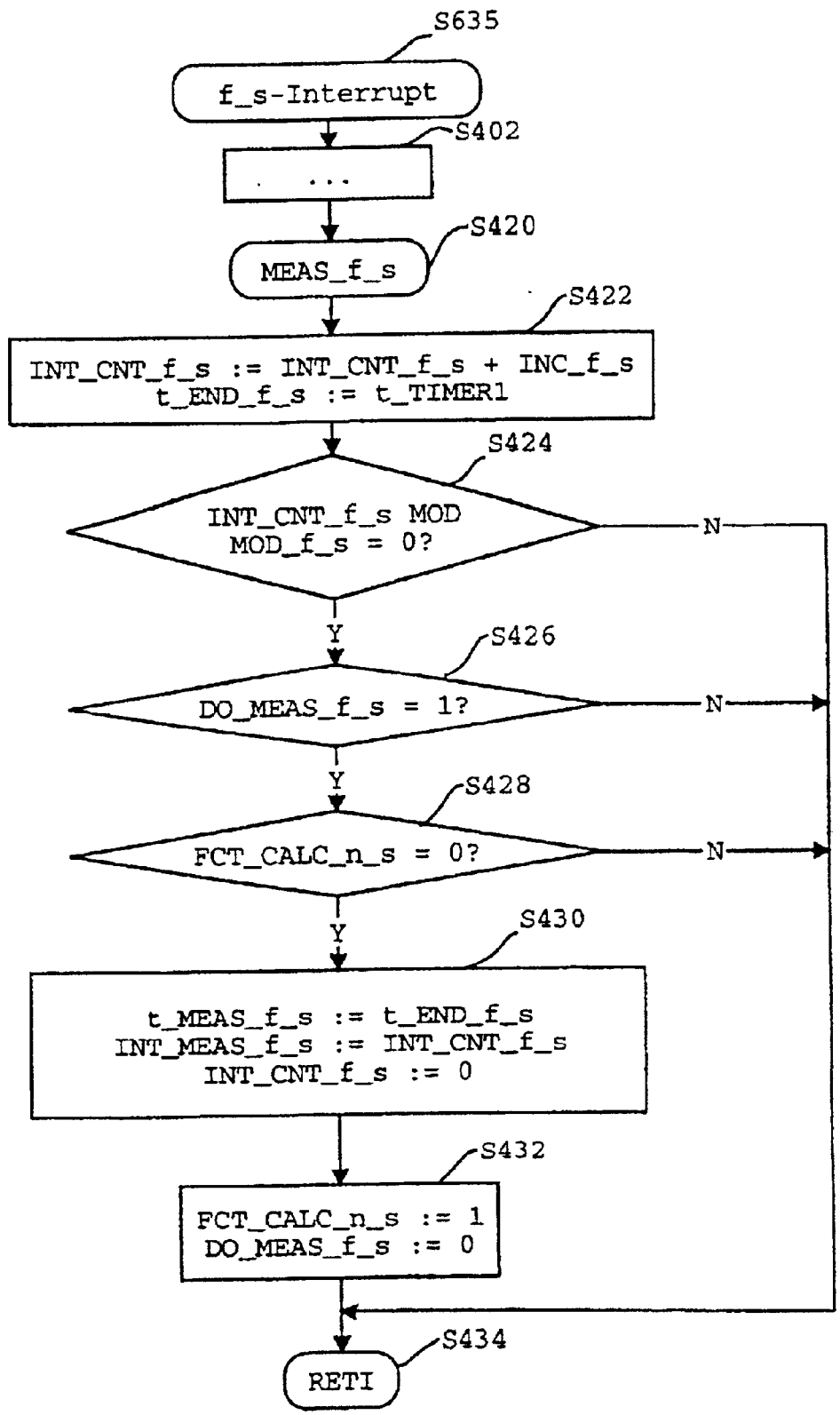
FIG. 14 is a flow chart for a function f_s Interrupt.

FIGS. 12 through 14 show flow charts pertaining to a program for the measurement procedure described in FIGS. 10 and 11.

FIG. 12 shows routine TIMER0 Interrupt S639 (FIG. 8) which, after each time T_A (FIG. 11), requests actual value measurement "MEAS f" 147 (FIG. 7), setpoint measurement "MEAS f_s" 141 (FIG. 7), and digital rotation speed controller n-CTRL 35 (FIGS. 1 and 7) constituted by RGL_ON S624 and RGL 5628 (both FIG. 3).

The following variables are used:

CNT_T_A Internal counter for time T_A

T_A_TIME Limit value for new measurement

DO_MEAS_f Flag to call actual value measurement

DO_MEAS_f_s Flag to call setpoint measurement

FCT_RGL_ON Function register bit of function RGL_ON S624 (cf. FIG. 9).

Routine TIMER0 Interrupt S639 depicted in FIG. 12 is executed each time a TIMER0 interrupt 638 (FIG. 8) occurs.

In S352 any additional steps not discussed here can be run through, if TIMER0 is additionally intended to control other program sections.

A subtimer Subtimer_T_A begins in S354. "Subtimer" means that the actual action in S360 is triggered by steps S356, S358, and S362 (explained below) only after a specific number of TIMER0 interrupts. The advantage of this is that timer TIMER0 can also be used for other duties that need to be called more frequently.

In 5356, internal counter CNT_T_A is incremented by 1.

S358 checks whether counter CNT_T_A is greater than or equal to the value T_A_TIME (defined above).

If No, execution branches immediately to the end S364, and leaves the TIMER0 Interrupt routine with the instruction "RETI."

If, however, it is found in 535B that counter CNT_T_A has reached the value T_A_TIME, then in S360 DO_MEAS_f_s, DO_MEAS_f, and FCT_RGL_ON are set to 1.

DO_MEAS_f_s=1 informs interrupt routine f_s Interrupt S635 (FIG. 14) that a measurement of setpoint frequency f_s is to be started. DO_MEAS_f=1 informs interrupt routine Hall Interrupt S631 (FIG. 13) that a measurement of actual frequency f is to be started. FCT_RGL=1 starts start function RGL_ON S624 (FIG. 17), which determines when controller function RGL S628 (FIG. 18) is started.

An example: if TIMER0 Interrupt is triggered every 10 microseconds, and the value T_A_TIME=2500, the call in S360 takes place every 25 ms.

Time T_A must be adapted to the particular motor. For example, if rotor position sensor 61 produces many events for each revolution of rotor 32, and if rotor 32 is rotating quickly, T_A can be made shorter. If rotor 32 is rotating slowly, however, T_A must then be made longer, e.g. TA=250 ms. Frequency f_s must be considered in the same fashion.

In S362, counter CNT_TA is reset back to zero in order to restart subtimer Subtimer_T_A.

In FIG. 11, S360 is called at points 161, 163, and 165.

FIG. 13 shows an exemplary embodiment of interrupt routine Hall Interrupt S631, which is executed at each interrupt triggered by the occurrence of an edge 110 (FIG. 4B) of signal f. This interrupt is so designated because it is usually triggered by the signal of a Hall generator 61. FIG. 29 shows an example of this. Of course it could also be triggered by the signal of an optical or mechanical sensor, and it could also be referred to as a "sensor-controlled" interrupt.

In this example, routine Hall Interrupt S631 provides commutation of an electronically commutated motor 32 in steps S304 through S314, and measurement of actual frequency f in steps S320 through S332.

The following variables are used:

INT_CNT_f Interrupt counter for counting the edges of signal f

INC_f Increment value t_END_f Instant of last interrupt sensed

MOD_f Number of interrupts for mod calculation (cf. equation (5a))

t_MEAS_f Measured time of last interrupt

INT_MEAS_f Number of interrupts measured since last measurement

DO_MEAS_f Flag to call actual value measurement

FCT_CALC_n Function register bit of function CALC_n S616 (FIGS. 8 and 9).

In S302, any desired steps can be executed.

In an electronically commutated motor (such as the one schematically depicted in FIG. 29), routine Hall Interrupt S631 provides electronic commutation in COMMUT S304. This is omitted in a collector motor such as the one depicted in FIG. 6.

In S306, HALL=1? checks whether signal f (FIG. 4B) is HIGH. If Yes, then in 5308, terminal B5 of $\mu$C 23 (FIG. 3) is set so that it triggers an interrupt at the next edge from HIGH to LOW. (Another alternative possibility is a so-called "interrupt on change," i.e. an interrupt takes place at every edge of signal HALL at port B5, regardless of direction.) Lastly, in S310 commutation of motor M 32 takes place by the fact that OUT1 is set to 1 and OUT2 to 0. If it was found in S306 that HALL equaled 0, then in S312 terminal B5 is set to an opposite edge, and in S314 OUT1 is set to 0 and OUT2 to 1. Commutation using the two signals OUT1 and OUT2 has already been described exhaustively with reference to FIG. 29.

Sensing and measurement of signal f begin in MEAS_f S320. In S322, interrupt counter INT_CNT_f, which is, for example, 1 byte long, is incremented by the value INC_f, e.g. INC_f=1, and the value t_TIMER1 of TIMER1 is stored in t_END_f. Both the number of interrupts and the instantaneous time are thus sensed.

In S324, INT_CNT_f mod MOD_f=0 is used to check whether the value in interrupt counter INT_CNT_f is a multiple of MOD_f. For MOD_f=4, for example, INT_CNT_f=20 is a multiple of MOD_f, i.e. 20 mod 4=0. If INT_CNT_f is not a multiple of MOD_f, execution then branches to the end S334 of the interrupt routine. If INT_CNT_f is a multiple of MOD_f, S326 then checks whether DO_MEAS_f=1, i.e. whether a measurement of actual frequency f was requested in step S360 of interrupt routine TIMER0 Interrupt S639 (FIG. 12). If No, then no measurement is to take place, and execution branches to the end S334. If Yes, then in S328 function register bit FCT_CALC_n is used to check whether the last rotation speed calculation is already complete. If FCT_CALC n=1, execution branches to the end S334. This prevents measurements from being lost if rotation speed calculation routine "CALC_n" S616 requires too much time. This special case does not, however, occur in normal operation.

In S330. variables t_MEAS_f and INT_MEAS_f, which are transferred to rotation speed calculation routine CALC_n 5616 (FIG. 15), are set.

This is done by setting t_MEAS_f to the last timer value t_END_f of ring counter TIMER1 that was sensed, setting INT_MEAS_f to the value of interrupt counter INT_CNT_f, and resetting INT_CNT_f to zero.

In S332, rotation speed calculation routine CALC_n S616 (FIG. 15) is requested by setting FCT_CALC_n to 1; and the measurement request is reset by resetting DO_MEAS_f to zero, since the measurement is complete.

Routines TIMER0 Interrupt S639 (FIG. 12) and HALL Interrupt S631 (FIG. 13) thus together constitute a measurement of actual frequency f in accordance with the state diagram of FIG. 10.

If $\mu$C 23 does not have the capability for the mod operation, there are other possibilities.

In many $\mu$Cs, an integral division using "div" yields as the result both the integral quotient and the non-negative remainder. For example, the result of 7 div 4 is a quotient 1 and remainder 3. In these $\mu$Cs, the div operation can be used to calculate the remainder.

A further possibility for calculating X mod MOD_f is, for example, to use a further variable MOD_CNT which is also incremented at each incrementing of variable X, and which is reset to zero each time MOD_f is reached. The MOD_CNT variable then contains the result of X mod MOD_f.

FIG. 14 shows an example of interrupt routine f_s Interrupt 5635.

This is configured, except for the absence of the commutation portion (steps S304 through S314), like interrupt routine HALL Interrupt S631 (FIG. 13), and therefore will not be described again. The reference characters of the steps are increased by 100, so that, for example, step S332 of FIG. 13 corresponds to step S432 of FIG. 14.

The following variables are used:

INT_CNT_f_s Interrupt counter for counting the edges of the setpoint frequency

INC_f_s Increment value t_END_f_s Instant of last interrupt sensed

MOD_f_s Number of interrupts for mod calculation t_MEAS_f_s Measured time of last interrupt INT_MEAS_f_s Number of interrupts since last measurement DO_MEAS_f_s Flag to call setpoint measurement FCT_CALC_n_s Function register bit for function CALC_n_s S620.

FIG. 15 shows routine CALC_n S616, which is requested by routine Hall Interrupt (S332 in FIG. 13) after the measurement of timer value t_MEAS_f and of the number of edges 110 (FIG. 4) of signal f in INT_MEAS_f.

The following variables are used:

Δt_CALC_f Time difference from last measurement t_OLD_f Instant of last measurement t_MEAS_f Instant of present measurement INT_CALC_f Number of interrupts since last measurement, for calculation INT_MEAS_f Number of interrupts transferred since last measurement n Rotation speed of motor M REM_n Remainder of integral division h Exponent for parameterization of INT_CALC_f REM_n_OLD Remainder of integral division at last calculation.

In S370, the difference between timer value t_OLD_f for the last measurement and present timer value t_MEAS_f is calculated, and is stored in variable Δt_CALC_f, which corresponds to value [Δ]t_MEAS_f of FIG. 11. In the context of a ring counter, the difference is usually obtained using the two's complement. Present timer value t_MEAS_f is then stored in t_OLD_f for the next measurement, and the measured number of interrupts INT_MEAS_f is stored in INT_CALC_f.

In S372, a calculation is made of rotation speed n, which is proportional to the quotient of the number of interrupts INT_CALC_f (an indication of the number of revolutions) and the time Δt_CALC_f required therefor. The formula is $$n = \text{const} * \text{INT\_CALC\_f}/\Delta t\_CALC\_f \quad (6)$$

where const is a proportionality constant.

An integral division div, which yields as the result an integral quotient n and positive remainder REM_n, is used to calculate rotation speed n. See FIG. 13 for a description of the div operator.

In addition, interrupt counter INT_CALC_f, which in this exemplary embodiment is, for example, 4 bytes long, is parameterized with a factor $2^h$, e.g. h=24. Any other factor can, of course, also be selected instead of $2^h$. Multiplication by $2^h$ can, however, in preferred fashion, be replaced by displacement of the value h places to the left.

Parameterization results in good resolution, for example in a 16-bit context, of the rotation speeds resulting from division. The exponent h must, for this purpose, be matched to the particular motor.

Calculation of the rotation speed for the region between points 175 and 177 of FIG. 11 is shown below as an example:

INT_MEAS_f has a length of one byte, INT_CALC_f four bytes, and Δt_CALC_f two bytes.

INT_MEAS_f(175–177) here has a value of 8, i.e. eight edges 110 of signal f (FIG. 11C) have been counted since the last measurement at instant t_MEAS_f(175). In S370 INT_CALC_f has the value INT_MEAS_f(175–177)=8 assigned to it. In S372, using h=19, INT_CALC_f is parameterized with $2^{19}$=524,288, and acquires a value of 4,194,304.

Δt_MEAS_f(175–177) has a value of 26,700, corresponding (if the resolution of ring counter TIMER1 is 1 microsecond) to a time of 26.7 milliseconds. In S370, Δt_CALC_f has assigned to it a value of 26,700, resulting from the difference between the old and present measurements.

Dividing INT_CALC_f by Δt_CALC_f yields a rotation speed n=157 and remainder REM_n 2404.

The physical rotation speed n_phys corresponds to the number of revolutions per minute. 8 Hall changes divided by 4 Hall changes per revolution (four-pole rotor) yields 2 revolutions, and time required therefor is 0.0267 s. This yields a physical rotation speed n_phys=2/0.0267=74.906 revolutions per second=4494.4 rpm.

The remainder REM_n_OLD of the previous rotation speed calculation is also taken into account in the calculation, by adding it to the product of INT_CALC_f and const_f.

In the above example, for instance, the calculated rotation speed n deviates slightly from the actual rotation speed, since division yields the whole number 157 rather than the actual result of approximately 157.09. The difference is not lost, however, but is taken into account in the subsequent division in S372 by adding remainder REM_n_OLD of the previous division to the numerator.

The advantageous result of taking into account remainder REM_n_OLD is that no information is lost; and it results in a measurable improvement in the controller if it is used.

After the calculation of n and REM_n, in S372 remainder REM_n is stored in REM_n_OLD for the next calculation.

In S374, function register bit FCT_CALC_n (FIG. 9; FIG. 13, S332) is reset back to zero, since the rotation speed calculation is complete.

Execution then branches back to the beginning S602 of the function manager (FIG. 8).

FIG. 16 shows a flow chart for calculating rotation speed setpoint n_s.

The following variables are used:

t_CALC_f_s Time difference from last measurement t_OLD_f_s Instant of last measurement t_MEAS_f_s Instant of present measurement INT_CALC_f_s Number of interrupts since last measurement, for calculation INT_MEAS_f_s Number of interrupts transferred since last measurement n_s Rotation speed setpoint (desired rotation speed of motor M)

REM_n_s Remainder of integral division h_s Exponent for parameterization of INT_CALC_f_s REM_n_SOLD Remainder of integral division at last calculation.

The calculation of rotation speed setpoint n_s is identical to the calculation of rotation speed n as shown in FIG. 15. The reference characters of FIG. 16 correspond to those of FIG. 15 with 100 added to them. Value h_s for the parameterization of INT_CALC_f is normally selected to be identical to value h of FIG. 15, since the rotation speed setpoint and actual rotation speed should be comparable. Selecting h_s to be not equal to h would make relative parameterization possible, but this is normally not chosen.

To avoid excessive length, the steps of FIG. 16 will not be described again. The reader is referred to FIG. 15 and its accompanying description.

Since the measurements of setpoint frequency f_s and actual frequency f proceed in the same manner and in quasi-parallel fashion, a value for rotation speed setpoint n_s and a value for rotation speed n are present after each measurement triggered by the TIMER0 interrupt. Values n and n_s are comparable because the times were measured, practically simultaneously, using the same timer TIMER1. In addition, they are very accurate because of the measurement methods used.

Overall Controller Starting the Controller with Function RGL_ON

FIG. 17 shows a flow chart for an exemplary embodiment of function RGL_ON S624 of FIG. 8, which determines when controller function RGL S628 (FIG. 16) is started.

Since the sensing and measurement of actual frequency f and setpoint frequency f_s, and thus also the calculation of rotation speed n and rotation speed setpoint n_s, proceed independently of one another and do not end at the same instant, a determination must be made in function RGL_ON S624 as to when controller function RGL S628 is started. In this exemplary embodiment, controller function RGL S628 is started when both actual rotation speed calculation routine CALC_n S616 and rotation speed setpoint calculation routine CALC_n_s S620 are complete.

The following variables are used:

FCT_CALC_n_s Function register bit for function CALC_n_s S620 (cf. FIG. 9)

FCT_CALC_n Function register bit for function CALC_n S616 (cf. FIG. 9)

FCT_RGL Function register bit for function RGL S628 (cf. FIG. 9)

FCT_RGL_ON Function register bit for function RGL_ON S624 (cf. FIG.

In S390, function register bit FCT_CALC_n_s is used to check whether rotation speed setpoint calculation CALC_n_s S620 is ready. If No, execution branches back to the beginning S602 of the function manager (FIG. 8). If Yes, then in S392, function register bit FCT_CALC_n checks whether rotation speed calculation routine CALC_n S616 is complete. If No, execution branches back to the beginning S602 of the function manager. If Yes, then both rotation speed n and rotation speed setpoint n_s are present, and controller function RGL S628 is requested by setting function register bit FCT_RGL to 1. Function register bit FCT_RGL_ON is reset to zero, since function RGL_ON S624 has been executed.

Controller function RGL S628 is therefore not started until rotation speed setpoint n_s and rotation speed n have been calculated.

Controller Function RGL with "Electronic Gearbox"

FIG. 18 shows a flow chart for an embodiment of controller function RGL S628 (FIG. 8) which calculates a control output RGL_VAL from rotation speed n and rotation speed setpoint n_s, and outputs it.

The following variables are used:

RGL_DIFF System deviation

X Gearbox factor

RGL_PROP Proportional component

RGL_P Proportional factor

RGL_INT Integral component

RGL_I Integral factor

RGL_VAL Control output calculated by controller

RGL_MAX Maximum control output.

In S530, system deviation RGL DIFF is calculated as $$RGL\_DIFF := n\_s * X - n \tag{7}$$

Multiplying rotation speed setpoint n_s by X implements a gearbox function. If X=2, for example, rotation speed setpoint n_s will correspond to half the desired rotation speed n of motor 32, in other words, motor M will run exactly twice as fast as rotation speed setpoint and if X=½, for example, rotation speed setpoint n_s will correspond to twice the rotation speed n, i.e. motor M will rotate at half the value of the rotation speed defined by n_s. This is explained below using a quantitative example.

This step establishes a specific ratio $$n/n\_s = X \tag{8}$$

between rotation speed n and rotation speed setpoint n_s. This also means a fixed ratio, for example $$f\_s/f = y/z \tag{1}$$

between actual frequency and setpoint frequency f_s, as explained in FIG. 1.

As is directly evident from S530, the system deviation could also be calculated differently, e.g. using the equation $$RGL\_DIFF := n\_s - Y * n \tag{7a}$$

as indicated at 145' in FIG. 7, or using the equation $$RGL\_DIFF := A * n\_s - B * n \tag{7b}$$

or using a suitable mathematical function, for example ln(n_s), or a time function, e.g.

$$RGL\_DIFF := (n\_s * \sin t) - n \tag{7c}$$

in which case the rotation speed would oscillate periodically between the positive rotation speed (n_s) and the negative rotation speed –(n_s). This requires, of course, a motor that can run in both rotation directions. A motor 32" of this kind is depicted as an example in FIG. 29. Most electronically commutated motors run in both rotation directions and are suitable for such applications.

It is also possible to introduce a gearbox factor by, for example, counting only every second "event" to obtain setpoint frequency f_s; and the same applies analogously to actual frequency f. Since numerical values are being compared to one another, any kind of known mathematical manipulation of those numerical values is possible, particular advantages always being yielded in individual cases.

Several further possibilities for embodying an "electronic gearbox", will be presented and explained below.

The multiplication of n_s by X can be performed, for example, as a fixed-point multiplication. In fixed-point multiplication, variable X is assumed to have a decimal point at a fixed location, so that the bits to the right of the decimal point correspond to multiplication by ½, ¼, etc. The advantage of fixed-point multiplication is that places after the decimal point are not lost.

Quantitative Example

A frequency f_s corresponding to a rotation speed setpoint of 3000 rpm is delivered from setpoint generator 20 (FIG. 1). Motor 32 needs, however, to run with a gearbox factor X that equals 0.5, i.e. at 1500 rpm.

In part 143 in FIG. 7 (corresponding to the flow charts in FIGS. 14 and 15), a rotation speed setpoint n_s of 3000.00 rpm is calculated from frequency f_s. The number 300,000 (corresponding to 493E0 in hexadecimal) is used internally in the computer because of its higher accuracy. This number is multiplied by the gearbox factor X=0.5, and the hexadecimal value 249F0 is obtained as setpoint X*n_s.

Motor 32 is rotating at the moment at 1499.99 rpm. The number 149,999 (as the hexadecimal number 249EF) is used in the computer because of its higher accuracy. This corresponds in FIG. 7 to the actual rotation speed n.

System deviation RGL_DIFF is then calculated in system deviation calculator 151 in S530 (FIG. 18), i.e.

n_s*X−n=249F0−249EF=1 (decimal)

(the value 1 is indicated in the decimal system to improve comprehension). Since the values for X*n_s and n had, in this example, previously been multiplied by 100, this value must be divided by 100 again; i.e. the actual value of the system deviation is 1/100=0.01 rpm.

This numerical value is further processed in S532 (FIG. 18) in the PI controller; and since the rotation speed is slightly too low, variable RGL_VAL is increased by the PI controller to bring the rotation speed to exactly 1500 rpm. Steps S534 through S540 hold variable RGL_VAL within the permissible limits 0 and RGL_MAX.

Thus, although a setpoint of 3000 rpm was defined as frequency f_s, the motor is controlled to 1500 rpm because a "gearbox factor" X of 0.5 is set. A different gearbox factor, e.g. 0.333, could also be set in similar fashion, and the motor would then be regulated to 1000 rpm.

It is also apparent from this example that one could just as easily leave the value for n_s unchanged, and instead multiply the value for n by 2 (in this example). The value for the system deviation would then be twice as great, but the control process would proceed in the same way.

The ratio n/n_s can also, additionally or alternatively, be influenced in the context of frequency measurement and rotation speed calculation by, for example, selecting different variables h (S372 in FIG. 15) and h_s (S472 in FIG. 16).

Taking into account the value of MOD_f in the measurement of actual frequency f (S324 in FIG. 13) and the value of MOD_f_s in the measurement of setpoint frequency f_s (S424 in FIG. 14) can also bring about a change in the ratio between frequencies f and f_s and thus also between rotation speeds n and n_s.

The point at which the desired ratio between rotation speeds n and n_s and between frequencies f and f_s is established is not significant for the present invention. The ratio must, however, be established at a suitable point.

S352 of FIG. 18 depicts a digital PI controller.

Proportional component RGL_PROP is calculated by multiplying system deviation RGL_DIFF by proportional factor RGL_P.

The new integral component is calculated by adding the previous integral component to system deviation RGL DIFF multiplied by integral factor RGL_I. Integral component RGL_INT preferably has sufficient memory available to it that no system deviation information is lost. Control output RGL_VAL is determined from the sum of proportional component RGL_PROP and integral component RGL_INT.

A range check of control output RGL_VAL is performed in steps S534 through S540.

If control output RGL_VAL is less than zero in S534, it is then set is to zero in S536.

If control output RGL_VAL is greater than the maximum permissible value RGL_MAX in S538, it is set to RGL_MAX in S540. The purpose of this is to limit control output RGL_VAL to maximum value RGL_MAX during acceleration of a motor, when large system deviations can exist.

If the value of RGL_VAL lies within a permissible range, it is used unchanged.

In S542, register PWM_SW of the PWM generator inside the μC is set to control output RGL_VAL, and PWM signal PWM_SW is outputted as described in FIG. 5.

Controller function S628 is thus complete, and function register bit FCT_RGL is reset in S544.

Execution then branches back to the beginning S602 of the function manager (FIG. 8).

Instead of the PI controller just described, it is also possible to use, for example, a PID controller or a different controller. Digital controllers in which all the bits of system deviation RGL_DIFF are taken into account (as guaranteed here by integral component RGL_INT) are advantageous. Controller factors RGL_P and RGL_I can be set separately in order to adapt the controller optimally to its particular task.

Figure 19:
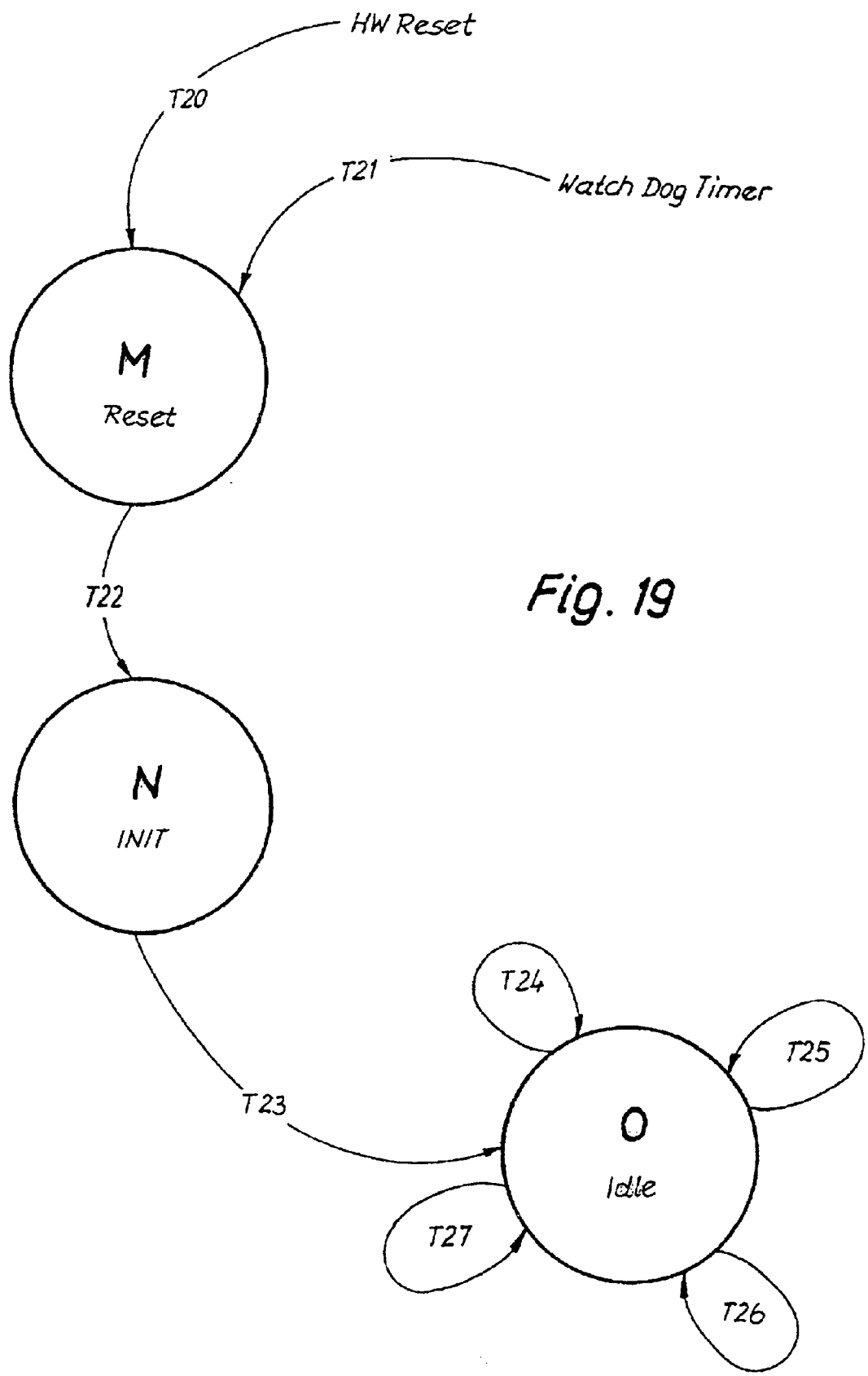
FIG. 19 is a state diagram for the general execution of the control process.

FIG. 19 shows a state diagram which summarizes in simple and comprehensible fashion the complex functional sequences of the previous Figures already described. Table 2 below provides the necessary explanations for this state diagram, and is largely self-explanatory (WDT means "watchdog timer").

| Transition | Result | Action | From . . . to |
|---|---|---|---|
| T20 | Hardware reset | Branch to program address 00h | –> M |
| T21 | Watchdog timer reset | Branch to program address 00h | –> M |
| T22 | Immediate state change with no event | No action | M –> N |
| T23 | Immediate state change with no event | Initialization. (Optional) retrieval of parameters from EEPROM 80 | N –> O |
| T24 | Calculation of actual value started | Perform calculation of actual value. Reset counter INT_CALC_f. Stop and inhibit calculation of actual value. | O –> O |
| T25 | Calculation of setpoint started | Perform calculation of setpoint. Reset counter INT_CALC_f_s. Stop and inhibit calculation of setpoint. | O –> O |
| T26 | Calculation of setpoint and actual value stopped. Controller enabled. | Start controller | O –> O |
| T27 | Controller started | S530 (X * n_s). Controller RGL (FIG. 18). S542 (setpoint output), S544 (stop and inhibit controller). | O –> O |

In the 0 (idle) state, the program is ready for action and performs various actions as required. At T24, for example, calculation of the actual frequency value is performed, counter INT_CALC_f is reset, and the actual value calculation is then inhibited until a new measurement has been performed. At transition T25, the same actions are performed for the setpoint.

At T26 the calculations of the setpoint and actual value are stopped, and controller RGL (FIG. 1) is started. The controller is then started at T27. In step S530, gearbox ratio X is taken into account. The calculations in the PI controller are performed, the control output is outputted in S542, and in S544 the controller is stopped and temporarily inhibited until new values are available after the next measurement.

States M and N usually are passed through only upon startup, since a hardware reset takes place at that time. If the watchdog (not depicted) detects any irregular behavior of μC 23, actions T21, T22, and T23 are performed in order to return μC 23 to its normal operating state 0.

Example of a Controller Capable of a Rotation Speed Setpoint n_s=0

Figure 20:
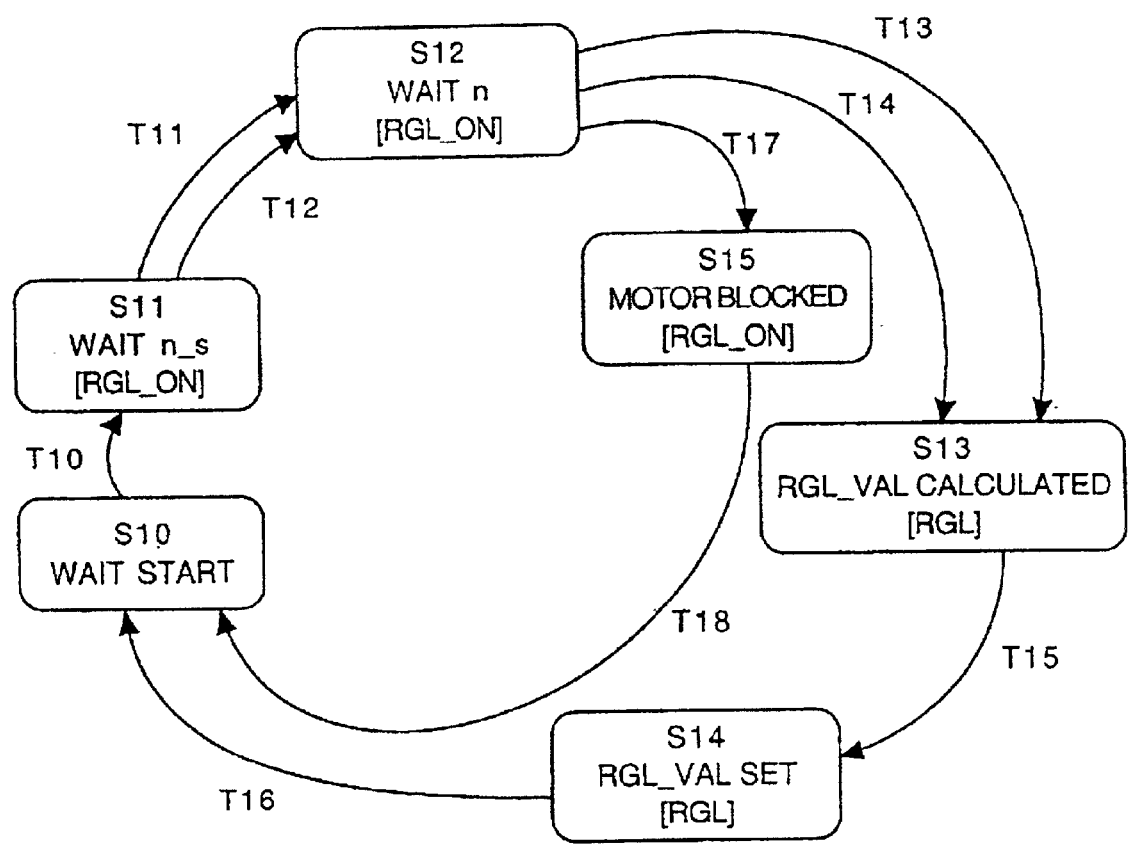
FIG. 20 is a state diagram for a controller in which the rotation speed setpoint n_s=0 can also be set.

FIG. 20 shows a state diagram for a controller in which a rotation speed setpoint n_s=0 can also be set.

Function RGL_ON S624 of FIG. 17 waits to start controller function RGL S628 until a value is present both for rotation speed setpoint n_s and for rotation speed n.

This creates difficulties with motors that need also to be controlled down to a rotation speed n=0, since no interrupts are triggered if signals f or f_s have a frequency of zero, because no edges of signals f Aft and f_s are present.

Figure 21:
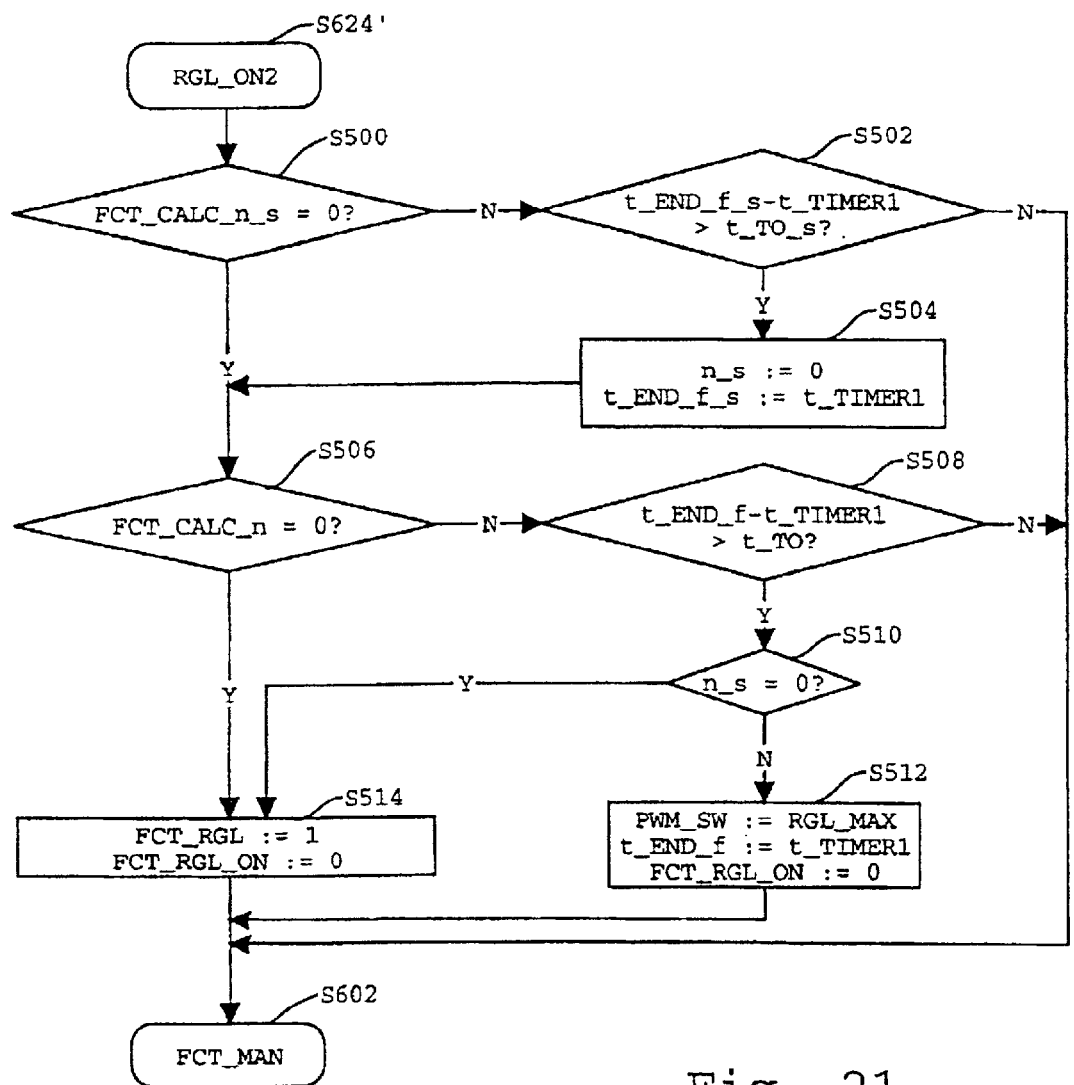
FIG. 21 is a flow chart for a function RGL_ON2 which is adapted to the state diagram of FIG. 20.

The controller shown in FIG. 21 allows control to a rotation speed of zero, and therefore represents a preferred development.

The state diagram contains six states S10 to S15, and nine transitions T10 to T18.

In Table 3 below, transitions T10 to T18 are described along with their events and actions. This table, like Tables 1 and 2, is comprehensible in and of itself.

| Transition | Event | Action |
|---|---|---|
| T10 | Controller has been started by TIMER0 interrupt | RGL_ON is started; branch to S11 |
| T11 | Rotation speed setpoint n_s is present | Branch to S12 |
| T12 | Time-out time for measurement of n_s has been exceeded | n_s :=0; branch to S12 |
| T13 | Rotation speed n is present | Start controller; calculate control output; branch to S13 |
| T14 | Time-out time for measurement of n has been exceeded, and n_s = 0 | n :=0; start controller; calculate control output; branch to S13 |
| T15 | Instantaneous | Output control output; branch to S14 |
| T16 | Instantaneous | Terminate controller; branch to S10 |
| T17 | Time-out time for measurement of n has been exceeded, and n_s < > 0 | Output maximum control output; branch to S15 |
| T18 | Instantaneous | Terminate RGL_ON; branch to S10 |

In state S10, execution waits for the controller to start.

When the controller is started, for example by means of routine TIMER0 Interrupt S639 of FIG. 12, execution branches to state S11 and then waits for rotation speed setpoint n_s.

If a value for rotation speed setpoint n_s is present, transition T11 to state S12 takes place.

If, however, a time-out time has been exceeded in S11 and no value for rotation speed setpoint n_s is present, transition T2 to state S12 (in which transition T12 rotation speed setpoint n_s is set to zero) then takes place.

In state S12, execution waits for rotation speed n of motor M. If a value for n is present, transition T13 to S13 takes place, controller function RGL S628 is started, and a new control output RGL_VAL is calculated.

From state S13, an instantaneous transition T15 to S14 takes place, and the calculated control output RGL_VAL is outputted.

From state S14, an instantaneous transition T16 to S10 takes place, and execution waits for the new start.

If a time-out time is exceeded in state S12, the motor has a rotation speed n=0.

A distinction is made between two cases when n=0. If rotation speed setpoint n_s is also equal to zero, transition T14 to S13 takes place and controller RGL S628 calculates a new control output RGL_VAL.

If, however, rotation speed n=0 and rotation speed setpoint n_s is not equal to zero, then either motor M is jammed or it needs to be started. A transition T17 to S15 takes place, and a maximum control output is outputted.

From state S15, an instantaneous transition T18 to state S10 takes place, and execution waits for the next start.

FIG. 21 shows a flow chart for a routine RGL_ON2 S624 adapted to FIG. 20, i.e. for the case in which n_s=0 also needs to be taken into consideration.

S500 checks whether rotation speed setpoint calculation routine CALC_n_s S620 (FIG. 16) has been executed, i.e. whether a rotation speed setpoint n_s is present.

If Yes, execution then branches to S506.

If No, S502 then checks whether a time-out time t_TO_s has been exceeded since the last measurement. This is done by calculating the difference between instant t_END_f_s of the last measurement (cf. FIG. 14) and the present instant of timer TIMER1, and comparing it to time-out time t_TO_s.

If time-out time t_TO_s has not yet been exceeded, execution branches to the beginning S602 of the function manager (FIG. 8), and waits for ; rotation speed setpoint n_s.

If time-out time t_TO_s has been exceeded, however, rotation speed setpoint n_s is then set to zero in S504. Instant t_END_f_s of the last measurement is furthermore set to the instantaneous value t_TIMER1 of TIMER1, so that TIMER1 does not exceed the value t_END_f_s. Execution then branches to S506.

S506, analogously to S500, checks whether a value for rotation speed n is present.

If Yes, then controller function RGL S628 (FIG. 18) is requested in S514 by setting function register bit FCT_RGL to 1, and routine RGL_ON2 is terminated by resetting FCT RGL_ON to zero.

If a value for rotation speed n is not present in S506, S508 then checks, by analogy with S502, as to whether time-out time t_TO has been exceeded since the last measurement of rotation speed n at instant t_END_f.

If No, execution then branches to S602 (FIG. 8), and continues to wait for a value for rotation speed n.

If time-out time t_TO has been exceeded, S510 checks whether rotation speed setpoint n_s=0.

If Yes, execution then branches to S514, and controller function RGL S628 is called with values n=0 and n_s=0.

If No, then either motor M is jammed, or it needs to be started at that time. Register PWM_SW of the PWM generator of μC 23 is therefore set in S512 to the maximum control output RGL_MAX. The value t_END_f is set, by analogy with S504, to the instantaneous timer value t_TIMER1 in order to prevent any overflow; and routine RGL_ON2 S624 is terminated by setting FCT_RGL_ON to zero and branching to S602.

This variant does not require any further modifications to be made to controller function RGL S628.

Time-out times t_TO_s and t_TO must be selected in accordance with the requirements of the controller and the motor. For example, a relatively short time-out time can be used to ensure that the motor is shut off below a defined minimum rotation speed. Many motors, for example gasoline engines, are difficult to regulate at low speeds since they then tend to oscillate, and it may be desirable in such cases not to allow these rotation speed ranges.

A typical value for t_TO is 100 ms, corresponding to a motor rotation speed of approx. 50 rpm. A value of 1000 ms would correspond to a rotation speed of approx. 5 rpm. In an electric motor, however, such a high value can result in thermal overload of the output-stage transistors (transistors 740, 744 in FIG. 29).

Parameterization of the Motor

All the variables explained so far can be defined by the manufacturer; in other words, the manufacturer "parameterizes" the motor. The variables can be present in a nonvolatile memory, e.g. in a ROM, flash ROM, or EEPROM 80 of FIG. 3; or they can be set, for example, using DIP switches. When the motor is started, they are then loaded, for example in step INIT S602 (FIG. 8), into the RAM of $\mu C$ 23.

The variables that are used can also, if applicable, be modified via bus B (FIG. 3). By way of this external bus B, the variables in EEPROM 80 can be modified if applicable. Alternatively, EEPROM 80 can be programmed by the manufacturer before it is installed. Other variables can also be programmed, for example proportional factor RGL__P of the controller, integral factor RGL__I, and the overall gain of the controller (FIG. 18). When different motors are used, this can be very important in terms of achieving optimum drive results.

The ability to influence variables MOD__f, MOD__f__s, and X is particularly important. With MOD__f and MOD__f__s it is possible to adjust the controller to different numbers of poles in the rotors used, and to different types of setpoint frequency generators 20. If f__s were generated, for example, by two-pole rotor 732 and Hall generator 61 of FIG. 29, MOD__f__s would then be set to 2 (or optionally also to 4) in order to obtain first-class control process results.

By adapting the parameters to the type of motor and setpoint generator being used, it is thus possible to use the same program for different motor types. The use of the same program for different motor types eliminates production and development costs, and the manufacturer can react very flexibly to customer needs. Distributors or preferred customers can also be permitted to program EEPROM 80 themselves, for example in the context of experiments to optimize a drive system. A password function can prevent unauthorized programming by users.

Parameterization of gearbox factor X allows the same setpoint frequency generator 20 to be used for several motors which must run with a fixed rotation speed ratio among them, although the rotation speed can differ from one motor to another. Gearbox factor X makes possible, for example, continuous tensioning during transport of a material web (e.g. 4 plastic films or textiles), if a gearbox factor X=1000 is selected for a first motor and a gearbox factor X=1001 for a second motor farther ahead in the direction of motion. This causes the second motor to run very slightly faster, thus causing tensioning of the web being transported.

Regulation by means of setpoint frequency f__s becomes more dynamic the higher the value of that frequency. With a higher setpoint frequency, however, $\mu C$ 23 also experiences a greater calculation operation load. A ratio between setpoint frequency f__s and actual frequency f of f__s:f$\geq$5:1 has proven advantageous for motors that must react quickly to changes in setpoint frequency. "Frequency" here is understood to mean the number of events per unit time, for example the number of edges 110 per second in the case of a Hall signal (FIG. 4).

FIG. 26 shows an example of the use of three motors according to the present invention. A setpoint frequency f__s is delivered from a frequency generator 180 via a line 187 to three motors 181, 183 and 185 according to the present invention. The rotor of motor 181 has two poles, that of motor 183 has four poles, and that of motor 185 has six poles. Different motors are necessary, for example, if motors with different power levels are required at various locations.

In this exemplary embodiment, all three motors are intended to run at the same rotation speed defined by the setpoint frequency. For that purpose, for example, gearbox factors X(181) of motor 181, x(183) of motor 183, and X(185) of motor 183 are set to X(181)=1, X(183)=2, and X(185)=3.

Figure 27:
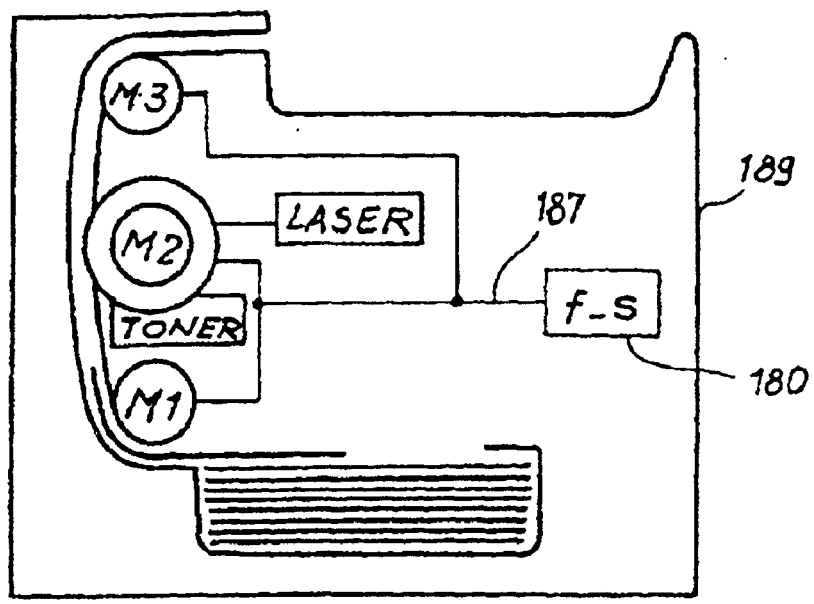
FIG. 27 is a highly schematized depiction of a copier that has three drive motors M1, M2, and M3, which all receive the same control signal f_s for their rotation speed and which, thanks to the gearbox function, run at different rotation speeds that are at defined numerical ratios to f_s.

FIG. 27 schematically shows a photocopier unit having three motors M1, M2, and M3 according to the present invention, which receive a defined frequency setpoint f__s via a line 187 from a frequency generator 180. If motor M2, which, for example, drives a roller, requires a rotation speed different from motors M1 and M3, it can be set via a gearbox factor X.

It is advantageous for a unit of this kind if a controller as shown in FIG. 20, with which the rotation speed of the motors can be regulated to zero by means of setpoint frequency f__s, is used.

FIG. 28 shows a further exemplary embodiment having three motors M1, M2, and M3. Motor M1 emits a so-called tacho signal. A tacho signal can be generated, for example, by outputting the signal of rotor position sensor 61. Using the tacho signal, further motors M2, M3 according to the present invention can be regulated at a fixed ratio to the rotation speed of motor M1. The result, even without any special frequency generator, is that the three motors run at a fixed rotation speed ratio to one another, since motor M1 serves as a frequency generator.

In the context of the invention, therefore, a setpoint datum that is contained in the frequency of a setpoint frequency signal is delivered to a $\mu C$. A motor for which that setpoint is determined in turn sends back a frequency signal which contains as datum the actual rotation speed of that motor. This frequency signal can come, for example, from a tachogenerator, a resolver, a sensor within the motor (e.g. a Hall generator for controlling commutation of the motor), or from other types of sensors.

The setpoint frequency and actual frequency are sensed, continuously and approximately synchronously, in the $\mu C$ and converted into numerical values that are proportional to rotation speed. These numerical values can then be manipulated with defined parameters, usually by multiplication or division. (Said parameters can be stored, for example, in an EEPROM.) What is obtained as a result is, for example, a multiple of the sensed setpoint frequency or a fraction of the sensed setpoint frequency, or a multiple of the sensed actual frequency or a fraction of the sensed actual frequency. These manipulated values are delivered to a rotation speed controller, and a gearbox function can thereby be implemented. In order to adapt or vary the control properties, it is moreover very easy to modify control parameters that influence the control behavior of the system.

The manipulated values are compared to one another in the rotation speed controller, the system deviation is determined from them and processed in a PI controller or a PID controller (as discussed in detail in S532 with reference to an example), and the control output generated in the controller is written, for example, into a PWM register. A corresponding PWM signal is outputted as the control output and, in the exemplary embodiment described, converted with an RC filter 65, 67 into an analog DC voltage signal. The latter is delivered to an adjusting member which controls energy delivery to the motor. The motor in turn sends a defined number of pulses or other signals ("events") back to the μC, and these provide the controller with exact digital information as to the present rotation speed of the motor.

Many modifications are, of course, possible in the context of the present invention. The gearbox factor X can be set at many points, as explained, and the actual frequency (corresponding to the actual rotation speed) can be generated in many different ways.

What is claimed is:

1. A method of controlling the actual value of the rotation frequency of a motor having a digital rotation frequency controller associated therewith, so that said motor will run at a target rotation frequency having a predetermined mathematical relationship to a target frequency supplied to said controller, comprising executing repeatedly, in an arbitrary sequence, the two steps of:

in a first time segment, having a length determined by events of the rotation frequency, obtaining, from the actual value of the rotation frequency signal, a first numerical frequency value characterizing the rotation frequency of the motor;

in a second time segment, having a length determined by events of the target frequency and overlapping the first time segment, obtaining, from said target frequency, a second numerical frequency value characterizing the frequency thereof;

followed by the step of, by means of the first and second numerical frequency values, controlling, using the digital speed controller, the rotation frequency of the motor toward a said target rotation frequency having a predetermined mathematical relationship to the target frequency.

2. The method according to claim 1, further comprising, in order to obtain said first and second numerical values, measuring the length of the first time segment and the length of the second time segment overlapping the first time segment.

3. The method according to claim 2, wherein the measuring of the first time segment and the measuring of the second time segment comprise measuring a time interval between edges of the respective frequency signal.

4. The method according to claim 2, further comprising using an identical time standard for time measurement for obtaining the first numerical value and for time measurement for obtaining the second numerical value.

5. The method according to claim 1, of determining a numerical value for the frequency of a frequency signal which, at a constant frequency, comprises a fixed number of events per unit time, said events being selected from the group consisting of signal pulses and signal edges, comprising the steps of:

a) at a first predetermined instant, initiating measurement of a frequency datum;

b) ascertaining a second instant, at which an event of the frequency signal subsequent to the first predetermined instant occurs;

c) counting the number of events of the frequency signal subsequent to the second instant;

d) at a third predetermined instant, initiating termination of measurement of the frequency datum;

e) ascertaining a fourth instant, at which an event of the frequency signal subsequent to the third predetermined instant occurs; and f) calculating the numerical value from the time interval between the second instant and fourth instant, and from the number of events of the frequency signal counted between said instants.

6. The method according to claim 5, wherein said step of ascertaining the fourth instant comprises using the next event of the frequency signal as the event subsequent to the third predetermined instant.

7. The method according to claim 5, further comprising, for ascertaining the fourth instant, selecting, as the event subsequent to the third predetermined instant, that next event of the frequency signal at which the number of events since the second instant is equal to a product a*N, where a and N are whole numbers, of which one is equal to at least 1 and the other is equal to at least 2.

8. The method according to claim 7, wherein, in the case of a rotation speed frequency signal (f), the number N corresponds to a fixed number of events per revolution of the rotor.

9. The method according to claim 5, further comprising continuously measuring said first and second numerical values.

10. The method according to claim 9, wherein the first predetermined instants of successive measurements have defined time offsets (T_A); and wherein the third predetermined instants each have a substantially constant time offset from the associated first predetermined instants.

11. The method according to claim 9, wherein the third predetermined instant of a first measurement corresponds to the first predetermined instant of a second measurement subsequent thereto.

12. The method according to claim 11, wherein the fourth instant of a first measurement corresponds to the second instant of a second measurement subsequent thereto.

13. The method according to claim 5, further comprising calculating said numerical value by dividing the number (N) of events of the frequency signal between the second and fourth instants by the time interval (Δt) between said second and fourth instants.

14. The method according to claim 13, further comprising the step of multiplying the numerical value by multiplication with a constant factor.

15. The method according to claim 14, further comprising selecting the constant factor such that the numerical value substantially corresponds to a conventional rotation speed indication.

16. The method according to claim 13, further comprising dividing a numerator proportional to the number of pulses between the second and fourth instants by a denominator proportional to the time interval between the second and fourth instants, obtaining, as a result, an integral frequency datum and a remainder; and using the remainder by adding it to the numerator of the subsequent measurement.

17. A method of obtaining a numerical value concerning the rotation speed of a rotor, according to claim 5, further comprising the steps of:

a) during a first measurement period (T_M1), counting the number (N) of events of the rotation speed signal (f);

b) measuring the time duration (Δt) of the first measurement period (T_M1);

c) performing an integral division ("div") in which the number of events during the first measurement period (T_M1) is the numerator and the time duration of the first measurement period (T_M1) is the denominator, thereby obtaining a first integral rotation speed numerical value and a remainder (S372; S472); and d) during a subsequent measurement, adding said remainder (REM_n_OLD; REM_n_s_OLD) to the numerator in a subsequent integral division forming part of said subsequent measurement.

18. The method according to claim 17, wherein the number (N) of events prior to the integral division (S372; S472) is multiplied by a constant factor that is greater than 1, in order to obtain a result of the integral division that is large in relation to the remainder (REM_n; REM_n_s).

19. The method according to claim 18, wherein the constant factor is a power of two ($2^h$; $2^{h\_s}$).

20. The method according to claim 19, wherein the exponent (h; h_s) of the power of two is an adjustable variable.

21. An apparatus comprising
a motor having a rotor,
a sensor (61) which furnishes a motor frequency signal (f) having a frequency defined by the rotation speed of said rotor and providing a defined number of events for each revolution of the rotor,
a digital rotation speed controller associated with said motor for controlling the rotation frequency thereof;
first input means for supplying the motor frequency signal to said digital controller;
second input means for supplying a target frequency to said digital controller;
said digital controller having a program associated therewith for controlling said rotation speed toward a target rotation speed having a predetermined mathematical relationship to said target frequency, said program being adapted for repeatedly executing, in an arbitrary sequence, the two steps of
in a first time segment, having a length determined by events of the motor frequency signal, obtaining from said signal a first numerical value characterizing the actual rotation speed of the motor,
in a second time segment, having a length determined by events of the target frequency and overlapping the first time segment, obtaining, from said target frequency, a second numerical value characterizing the target frequency;
followed by the step of, by means of said first and second numerical values, controlling, using the digital speed controller, the rotation speed of the motor toward said target rotation speed having a predetermined mathematical relationship to said target frequency.

22. An apparatus according to claim 21 which performs the steps of:
a) initiating measurement of the first numerical value in response to a first control signal;
b) ascertaining a first instant, at which an event of the rotation speed signal (f) subsequent to the first control signal occurs;
c) counting the number of events of the rotation speed signal (f) subsequent to said first instant;
d) initiating termination of measurement of the first numerical value in response to a second control signal;
e) ascertaining a second instant, at which an event of the rotation speed signal (f) subsequent to the second control signal occurs;
f) calculating said first numerical value from the time interval (Δt_MEAS_f(175–177)) between the first instant (161) and the second instant (163), and from the number (N) of events of the rotation speed signal (f) between said two instants; and
g) using the thus-calculated numerical value in controlling rotation speed.

23. The apparatus according to claim 22, wherein the source of the control signals comprises a timer (TIMERØ).

24. The apparatus according to claim 23, wherein the timer (TIMERØ) is configured so as to trigger interrupt operations (TIMERØ Interrupt) as control signals.

25. The apparatus according to claim 22, further comprising a timer (TIMER1) for measuring time elapsed between the first and second instants.

26. The apparatus according to claim 25, wherein the timer (TIMER1) for measuring the time between the first and second instants is a ring counter.

27. The apparatus according to claim 26, wherein
the ring counter (TIMER1), in operation, counts continuously, and the end of a completed measurement is substantially contemporaneous with the beginning of a new measurement.

28. The apparatus according to claim 21, wherein a signal from an electronically commutated motor serves as the motor frequency signal (f).

29. The apparatus according to claim 21, wherein a counter (INT_CNT_f) for events of the rotation speed motor frequency signal (f) is provided.

30. An apparatus according to claim 21, wherein said apparatus responds to application of a target value frequency of zero by regulating rotation speed to zero.

31. The apparatus according to claim 21, wherein a single timer (TIMER0) is provided for both measuring the length (Δt_MEAS_f) of the first time segment and measuring the length (Δt_MEAS_f_s) of the second time segment.

32. A method of ascertaining a plurality of numerical values characterizing the frequencies of a plurality of sensed signals (f; f_s), said signals each comprising a sequence of events selected from the group consisting of signal pulses and signal edges, comprising the steps of:
a) for at least two of said signals, initiating measurement of their associated numerical value at a first predetermined instant;
b) for each of said signals, ascertaining a second instant, at which a frequency datum of said signal subsequent to the first predetermined instant occurs;
c) separately sensing the number of events of each of said signals subsequent to the second instant;
d) at a third predetermined instant, initiating termination of measurement of said signals;
e) for each of said signals, separately ascertaining a fourth instant, at which a frequency datum of said signal subsequent to the third predetermined instant occurs;
f) from the time interval between the respective second instant and the respective fourth instant, and from the number of frequency data of the respective signal between said respective instants, calculating, for each of said signals, the numerical value characterizing its frequency.

33. The method according to claim 32, further comprising, in order to ascertain the respective fourth instant,
selecting the next frequency datum of the respective signal as the frequency datum subsequent to the third predetermined instant.

34. The method according to claim 32, further comprising, in order to ascertain the respective fourth instant, selecting, as the frequency datum subsequent to the third predetermined instant, that next frequency datum of the respective signal at which the number of frequency data since the second instant corresponds to an integral multiple of a whole number from the series 2, 3, 4, . . . .

35. The method according to claim 32, wherein frequency measurements are performed continuously and the third predetermined instants each have a substantially constant time offset (T_A) from the associated first predetermined instants.

36. The method according to claim 35, wherein the third predetermined instant of the measurement of a signal corresponds to the first predetermined instant of a subsequent measurement.

37. The method according to claim 35, wherein
the fourth instant of a measurement corresponds to the second instant of a subsequent measurement of the same signal.

38. The method according to claim 32, wherein
the first predetermined instants, for initiating measurement of the plurality of signals, are substantially identical to each other.

39. The method according to claim 32, wherein the third predetermined instants, for initiating termination of the measurement of the plurality of signals, are substantially identical to each other.

40. A method of controlling the actual value of the rotation frequency of a motor having a digital rotation frequency controller associated therewith so that said motor will run at a target rotation frequency having a predetermined mathematical relationship to a target frequency supplied to said controller, comprising:

proving a rotation frequency signal and a target frequency signal;

using an identical time standard, repeatedly executing, in an arbitrary sequence, the following two steps:

measuring the length of a first time segment by measuring a time interval between edges of the rotation frequency signal and obtaining, from the rotation frequency signal and the measured length of the first time segment, a first numerical value characterizing the actual rotation frequency of the motor;

measuring the length of a second time segment by measuring a time interval between edges of the target frequency signal and obtaining, from the target frequency signal and the measured length of the second time segment, a second numerical value characterizing the frequency of the target frequency signal;

followed by the step of:

by means of said first and second numerical values, controlling, using the digital frequency controller, the rotation frequency of the motor toward said target rotation frequency having a predetermined mathematical relationship to said supplied target frequency.

41. The method according to claim 39, of determining a numerical value for the frequency of a frequency signal which, at a constant frequency, comprises a fixed number of events per unit time, said events being selected from the group consisting of signal pulses and signal edges, comprising the steps of:
a) at a first predetermined instant, initiating measurement of a frequency datum;
b) ascertaining a second instant, at which an event of the frequency signal subsequent to the first predetermined instant occurs;
c) counting the number of events of the frequency signal subsequent to the second instant;
d) at a third predetermined instant, initiating termination of measurement of the frequency datum;
e) ascertaining a fourth instant, at which an event of the frequency signal subsequent to the third predetermined instant occurs; and
f) calculating the numerical value from the time interval between the second instant and fourth instant, and from the number of events of the frequency signal counted between said instants.

42. The method according to claim 41, wherein
said step of ascertaining the fourth instant comprises using the next event of the frequency signal as the event subsequent to the third predetermined instant.

43. The method according to claim 41, further comprising, for ascertaining the fourth instant, selecting, as the event subsequent to the third predetermined instant, that next event of the frequency signal at which the number of events since the second instant is equal to a product a*N, where a and N are whole numbers, of which one is equal to at least 1 and the other is equal to at least 2.

44. The method according to claim 43, wherein, in the case of a rotation speed frequency signal (f), the number N corresponds to a fixed number of events per revolution of the rotor.

45. The method according to claim 41, further comprising continuously measuring said first and second numerical values.

46. The method according to claim 45, wherein the first predetermined instants of successive measurements have defined time offsets (T_A); and
wherein the third predetermined instants each have a substantially constant time offset from the associated first predetermined instants.

47. The method according to claim 46, wherein the third predetermined instant of a first measurement corresponds to the first predetermined instant of a second measurement subsequent thereto.

48. The method according to claim 47, wherein the fourth instant of a first measurement corresponds to the second instant of a second measurement subsequent thereto.

49. The method according to claim 41, further comprising
calculating said numerical value by dividing the number (N) of events of the frequency signal between the second and fourth instants by the time interval ($\Delta t$) between said second and fourth instants.

50. The method according to claim 49, further comprising the step of multiplying the rotation speed datum by multiplication with a constant factor.

51. The method according to claim 50, further comprising selecting the constant factor such that the rotation speed datum substantially corresponds to a conventional rotation speed indication.

52. The method according to claim 49, further comprising dividing a numerator proportional to the number of pulses between the second and fourth instants by a denominator proportional to the time interval between the second and fourth instants, obtaining, as a result, an integral frequency datum and a remainder; and
using the remainder by adding it to the numerator of the subsequent measurement.

53. The method of obtaining a numerical value concerning the rotation speed of a rotor, according to claim 41, further comprising the steps of:
a) during a first measurement period (T_M1), counting the number (N) of events of the rotation speed signal (f);

b) measuring the time duration ($\Delta t$) of the first measurement period (T_M1);

c) performing an integral division ("div") in which the number of events during the first measurement period (T_M1) is the numerator and the time duration of the first measurement period (T_M1) is the denominator, thereby obtaining a first integral rotation speed numerical value and a remainder (S372; S472); and d) during a subsequent measurement, adding said remainder (REM_n_OLD; REM_n_s_OLD) to the numerator in a subsequent integral division forming part of said subsequent measurement.

54. The method according to claim 53, wherein the number (N) of events prior to the integral division (S372; S472) is multiplied by a constant factor that is greater than 1, in order to obtain a result of the integral division that is large in relation to the remainder (REM_n; REM_n_s).

55. The method according to claim 54, wherein the constant factor is a power of two ($2^h$; $2^{h\_s}$).

56. The method according to claim 55, wherein the exponent (h; h_s) of the power of two is an adjustable variable.

* * * * *

UNITED STATES PATENT AND TRADEMARK OFFICE
CERTIFICATE OF CORRECTION

PATENT NO. : 6,831,431 B1  
APPLICATION NO. : 10/019849  
DATED : December 14, 2004  
INVENTOR(S) : Roland Dieterle et al.

It is certified that error appears in the above-identified patent and that said Letters Patent is hereby corrected as shown below:

In column 1, line 19, after "offset" "1" should be deleted

In column 1, line 26, "is" should be deleted

In column 4, line 9, "Fig. 13" should be --Fig. 18--

In column 7, line 38, "t" should be --f--

In column 7, line 62, "u" should be "U"

In column 8, line 30, "u D" should be --u ____ D--

In column 8, line 32, " ____ M " should be deleted

In column 8, line 35, "GB" should be --6B--

In column 8, line 60, "73B" should be --738--

In column 8, line 62, "74B" should be --748--

In column 9, line 32, "PI-RCL" should be --"PI-RGL"--

In column 9, line 37, "3" should be --S--

In column 9, line 60, "w-th" should be --with--

In column 10, line 32, after "labeled" "1" should be deleted

In column 10, line 60, "n s" should be -- ____n____s --

In column 10, line 61, "n s" should be -- ____n____s --

In column 11, line 1, "CALC n" should be --CALC____n--

In column 11, line 3, "CALC" n____s" should be --CALC____n____s--

In column 11, line 18, "FCT XY=0" should be --FCT____XY=0--

In column 11, line 45, "S605" should be --S606--

UNITED STATES PATENT AND TRADEMARK OFFICE
CERTIFICATE OF CORRECTION

PATENT NO.      : 6,831,431 B1
APPLICATION NO. : 10/019849
DATED           : December 14, 2004
INVENTOR(S)     : Roland Dieterle et al.

It is certified that error appears in the above-identified patent and that said Letters Patent is hereby corrected as shown below:

In column 12, line 13, "266" should be --268--

In column 12, line 44, "is" should be deleted

In column 13, line 8, "32" should be --32'--

In column 13, line 12, "32," should be --32'--

In column 14, line 13, "32" should be --32'--

In column 15, line 24, "B" should be --s--

In column 16, line 35, "(5)" should be --(5')--

In column 16, line 39, "3" should be --8--

In column 18, line 34, "5628" should be --S628--

In column 18, line 54, "5356" should be --S356--

In column 18, line 60, "535B" should be --S358--

In column 19, line 52, "5308" should be --S308--

In column 20, line 22, "5616" should be --S616--

In column 20, line 48, "5635" should be --S635--

In column 21, line 21, "At" should be --Δt--

In column 21, line 24, "f Meas__f" should be --f__Meas__f--

In column 21, line 54, "At" should be --Δt--

In column 22, line 45, "REM____n____SOLD" should be --REM___n___s___OLD--

In column 22, line 47, "n s" should be --n____s--

In column 23, line 6, "FIG. 16" should be --FIG. 18--

UNITED STATES PATENT AND TRADEMARK OFFICE
CERTIFICATE OF CORRECTION

PATENT NO. : 6,831,431 B1
APPLICATION NO. : 10/019849
DATED : December 14, 2004
INVENTOR(S) : Roland Dieterle et al.

It is certified that error appears in the above-identified patent and that said Letters Patent is hereby corrected as shown below:

In column 23, line 26, "(cf. FIG" should be --(cf. FIG. 9)--

In column 23, line 61, "5530" should be --S530--

In column 23, line 61, "RGL DIFF" should be --RGL____DIFF--

In column 24, line 1, after "setpoint" --n____s; -- should be inserted

In column 25, line 45, "RGL DIFF" should be --RGL____DIFF--

In column 25, line 55, "is" should be deleted

In column 26, line 57, "(FIG 1)" should be --(FIG. 18)--

In column 27, line 12, "Aft" should be deleted

In column 27, line 53, "T2" should be --T12--

In column 28, line 9, "S624" should be --S624'--

In column 28, line 24, ";" should be deleted

In column 28, line 54, "S624" should be --S624'--

In column 30, line 8, "x(183)" should be --X(183)--

In column 30, line 9, "183" should be --185--

In column 34, line 26, claim 29, line 2, "rotation speed" should be deleted.

UNITED STATES PATENT AND TRADEMARK OFFICE
CERTIFICATE OF CORRECTION

| | |
|---|---|
| PATENT NO. | : 6,831,431 B1 |
| APPLICATION NO. | : 10/019849 |
| DATED | : December 14, 2004 |
| INVENTOR(S) | : Roland Dieterle et al. |

It is certified that error appears in the above-identified patent and that said Letters Patent is hereby corrected as shown below:

In column 34, line 32, claim 31, line 2, "(TIMER 0)" should be -- (TIMERØ)--

Signed and Sealed this

Twenty-first Day of August, 2007

JON W. DUDAS
*Director of the United States Patent and Trademark Office*